(12) United States Patent
Bleazard

(10) Patent No.: US 11,562,326 B2
(45) Date of Patent: Jan. 24, 2023

(54) USER INTERFACE AND SYSTEM FOR CLIENT DATABASE MANAGEMENT

(71) Applicant: eCU Technology, LLC, Houston, TX (US)

(72) Inventor: John David Bleazard, Katy, TX (US)

(73) Assignee: ECU TECHNOLOGY, LLC, Houston, TX (US)

( * ) Notice: Subject to any disclaimer, the term of this patent is extended or adjusted under 35 U.S.C. 154(b) by 81 days.

(21) Appl. No.: 16/794,490

(22) Filed: Feb. 19, 2020

(65) Prior Publication Data

US 2020/0265384 A1 Aug. 20, 2020

Related U.S. Application Data

(60) Provisional application No. 62/808,193, filed on Feb. 20, 2019.

(51) Int. Cl.
*G06Q 10/10* (2012.01)
*G06Q 30/00* (2012.01)
(Continued)

(52) U.S. Cl.
CPC ........... *G06Q 10/10* (2013.01); *G06F 3/0482* (2013.01); *G06F 16/212* (2019.01); *G06N 5/04* (2013.01);
(Continued)

(58) Field of Classification Search
CPC ....... G06Q 40/02; G06F 21/41; G06F 16/168; G06F 2203/04803; G06F 3/04886; G06F 9/451
See application file for complete search history.

(56) References Cited

U.S. PATENT DOCUMENTS 6,236,975 B1 * 5/2001 Boe .................. G06Q 30/02
705/14.66
7,761,345 B1 * 7/2010 Martin .............. G06Q 30/0601
705/28

(Continued)

FOREIGN PATENT DOCUMENTS

| CA | 2250848 | * 12/1997 | ............. G06Q 40/02 |
| CN | 101425132 A | * 5/2009 | ............. G06K 9/033 |
| CN | 105426032 A | * 3/2016 | ........... G06F 3/0481 |

OTHER PUBLICATIONS

NPL article "Split Screen for 2 different accounts" by Microsoft (Year: 2019).*

(Continued)

*Primary Examiner* — Christine M Behncke
*Assistant Examiner* — Mary M Gregg
(74) *Attorney, Agent, or Firm* — Haynes and Boone, LLP

(57) ABSTRACT

Improved workflow processes for efficiently progressing through a credit union membership application using a user interface having a specially structured layout to facilitate the progression are disclosed. Initially, the user interface presents a membership account selection option to select which type of membership account to initiate. Based on the selected type of membership account, the user interface then displays a product selection option for selecting a specific type of product to initiate with the credit union. The user interface then displays an applicant information option structured to receive information about an applicant. Based on this information, there is a determination as to whether the applicant qualifies for membership. Additionally, the layout of the user interface is specifically required to have a number of features, which are designed to facilitate the application workflow.

20 Claims, 25 Drawing Sheets

(51) Int. Cl.
  G06Q 40/02 (2012.01)
  G06F 16/21 (2019.01)
  G06N 5/04 (2006.01)
  G06F 3/0482 (2013.01)
  G06N 20/00 (2019.01)
  G06F 3/04817 (2022.01)
  G06F 15/02 (2006.01)
  G06F 9/451 (2018.01)
  G06Q 30/06 (2012.01)

(52) U.S. Cl.
  CPC ......... G06N 20/00 (2019.01); G06Q 30/0185 (2013.01); G06Q 40/025 (2013.01); G06F 3/04817 (2013.01); G06F 9/451 (2018.02); G06F 15/0225 (2013.01); G06F 2203/04803 (2013.01); G06Q 30/0641 (2013.01)

(56) References Cited

U.S. PATENT DOCUMENTS

| | | | | |
|---|---|---|---|---|
| 8,965,788 | B2* | 2/2015 | Gonsalves | G06Q 30/02 705/14.54 |
| 9,736,469 | B2* | 8/2017 | Schaefer | H04N 21/4882 |
| 10,152,210 | B2* | 12/2018 | Gunderson | H04L 51/36 |
| 10,168,863 | B2* | 1/2019 | Glidden | H04L 67/10 |
| 10,269,063 | B2* | 4/2019 | Ruebush | G06Q 40/025 |
| 10,754,510 | B1* | 8/2020 | Becker | G06F 16/287 |
| 10,976,887 | B2* | 4/2021 | Hao | G06F 3/04886 |
| 11,013,902 | B2* | 5/2021 | Chelak | A61M 39/0247 |
| 2002/0069159 | A1* | 6/2002 | Talbot | G06Q 40/02 705/38 |
| 2005/0075964 | A1* | 4/2005 | Quinn | H04N 1/2179 705/37 |
| 2005/0160019 | A1* | 7/2005 | Cluse | G06Q 40/06 705/35 |
| 2007/0277235 | A1* | 11/2007 | Barrett | G06F 21/41 726/12 |
| 2008/0215349 | A1* | 9/2008 | Baran | G06Q 10/10 705/1.1 |
| 2012/0054095 | A1* | 3/2012 | Lesandro | G06Q 20/12 705/39 |
| 2013/0021652 | A1* | 1/2013 | Yoon | H04N 1/387 358/452 |
| 2013/0124414 | A1* | 5/2013 | Roach | G06Q 20/10 705/44 |
| 2013/0262673 | A1* | 10/2013 | Hall | G06F 21/33 709/225 |
| 2014/0369570 | A1* | 12/2014 | Cheikh | G07C 9/22 382/116 |
| 2015/0199213 | A1* | 7/2015 | Desai | G06F 9/468 718/102 |
| 2015/0347769 | A1* | 12/2015 | Espinosa | H04L 63/168 726/28 |
| 2015/0370458 | A1* | 12/2015 | Chen | G06F 3/04842 715/727 |
| 2016/0034580 | A1* | 2/2016 | Chakra | G06F 16/951 707/707 |
| 2016/0328572 | A1* | 11/2016 | Valacich | G06F 21/32 |
| 2018/0059882 | A1* | 3/2018 | Tanabe | G06F 3/0482 |
| 2018/0107914 | A1* | 4/2018 | Ziola | G06K 19/10 |
| 2018/0260871 | A1* | 9/2018 | Harvill | G06F 3/04847 |
| 2018/0315127 | A1* | 11/2018 | Chappell | G06Q 20/047 |
| 2018/0373711 | A1* | 12/2018 | Ghatage | H04N 1/04 |
| 2019/0278986 | A1* | 9/2019 | Nepomniachtchi | G06K 9/42 |
| 2020/0342378 | A1* | 10/2020 | McCormick | G06Q 50/08 |

OTHER PUBLICATIONS

Can you have dual PSN account logins in split screen online by Gamefaqs (Year: 2014).*

* cited by examiner

User Interface 1100

Membership | Products | Applicants | Review | Funding | Verification

Primary Applicant

[1105] Take a picture of your driver's license or state issued ID to pre-fill your application First Name | MI (Optional) | Last Name | Suffix (Optional)

Date of Birth | Gender

Residential Address | Apt, Suite, Unit (Optional)

Zip | City | State

Cell Phone | Home Phone | Work Phone (Optional) | Email Address

*Figure 11*

User Interface
1300

| Membership | | | |
|---|---|---|---|
| Products | Applicants | Review | Funding | Verification |

Primary Applicant

⬆ Take a picture of your driver's license or state issued ID to pre-fill your application — 1310
✓ Front of license has been successfully captured. — 1315
✓ Back of license has been successfully decoded. — 1320

First Name: Darian
MI (Optional):
Last Name: Simpson
Suffix (Optional):

— 1305

Date of Birth: 03/01/1980
Gender: Male

Residential Address: 083 Prospect St.
Apt, Suite, Unit (Optional):

Zip: 06511
City: New Haven
State: Connecticut

Cell Phone:
Home Phone:
Work Phone (Optional):
Email Address:

User Interface 1600

Membership | Products | Applicants | Review | Funding | Verification

Employment Information

Employer: [ ]    Occupation: [ ]

[Add Co-Applicant]

Beneficiary Information    ← 1605    [Remove]

First Name: [ ]    MI (Optional): [ ]    Last Name: [ ]    Suffix (Optional): [ ]

Date of Birth: [ ]    Relationship: [▽]    Pay On Death Ratio (%): [ ]

Residential Address: [ ]    Apt, Suite, Unit (Optional): [ ]

Zip: [ ]    City: [ ]    State: [▽]

Phone (Optional): [ ]

[Add Beneficiary]

[Prev] [Next] [Save Progress]

USER INTERFACE AND SYSTEM FOR CLIENT DATABASE MANAGEMENT

CROSS-REFERENCE TO RELATED APPLICATIONS

This application claims the benefit of and priority to U.S. Provisional Patent Application Ser. No. 62/808,193 filed on Feb. 20, 2019 and entitled "USER INTERFACE AND SYSTEM FOR CLIENT DATABASE MANAGEMENT," which application is expressly incorporated herein by reference in its entirety.

BACKGROUND

A "credit union" (e.g., credit union 100 in FIG. 1) is a type of financial institution that is member-owned financial cooperative. One objective of a credit union is to provide its members with financial rates (e.g., loans, certificates of deposit, etc.), financial products (e.g., checking shares and loans), and other services that are competitive and exclusive to its members.

A credit union is different and legally distinct from a traditional bank. While both are financial institutions, a bank is a for-profit institution available to any person, without discretion. In contrast, a credit union is a non-profit institution and provides products and services only to its member-owners. To clarify, in order to utilize the services and products offered by a credit union, an entity must have a membership with that credit union. In contrast, any entity may utilize the services and products of a bank, without a membership.

Because banks are for-profit institutions, they are typically subject to taxes. Often, the banks pass the costs incurred from paying taxes onto their clients. Because credit unions are non-profit institutions, they pass their profits on to their members and thus are able to typically charge relatively lower fees than banks.

A credit union's bylaws or charter dictates or mandates who is able to become a member. In this regard, a credit union is considered to be a "cooperative" having members who are linked via a common bond and who have shares with the credit union. The bylaws or charter define what this common bond will be. For instance, in some cases, the common bond is that all members work in the same industry or that all members live in the same geographic area or community or even that all members share the same religious institution. For a candidate (e.g., candidate 105 in FIG. 1) to become a member, that candidate must satisfy the membership qualification requirements of the bylaws or charter. Accordingly, as a result of the legalities associated with a credit union, an entity cannot make use of the products and services offered by a credit union until that entity has become a member. As a consequence, there is a hurdle or a barrier to entry 110 that must be satisfied in order to engage with the credit union, where this barrier to entry 110 is membership 115 with the credit union. This barrier to entry 110 is unique to credit unions and has resulted in difficulties in the credit union industry, which difficulties are not present in other financial institutions. What is needed, therefore, is a technique to effectively eliminate this barrier to entry 110 to help credit unions be as competitive as other financial institutions.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Embodiments disclosed herein relate to systems, devices, and methods that operate to effectively eliminate the barrier to entry associated with initially utilizing the products and services offered by a credit union. In particular, the disclosed embodiments provide for a streamlined workflow process that enables candidates/applicants to readily and easily obtain membership with a credit union in a manner such that the barrier to entry is effectively nullified. To do so, the disclosed embodiments provide streamlined workflow processes and improved user interfaces, thereby resulting in an efficient, computer-automated credit union application process.

In some embodiments, a user interface is presented, where the user interface is specifically designed to have a particular visual layout structured to facilitate progression of a membership application workflow to determine membership eligibility of an applicant with a credit union. The workflow initially causes the user interface to display a membership account selection option for selecting a type of membership account to initiate with the credit union. Based on the selected type of membership account, the user interface then displays a product selection option to enable the applicant to select one or more types of products to initiate with the credit union. The user interface then continues the workflow by displaying an applicant information option, which allows personal information about the applicant to be entered. Based on the information entered in the applicant information option, there is then a determination as to whether the applicant is eligible for membership with the credit union. Notably, the user interface used to facilitate these workflow processes is required to visually display an image of an identification (ID) of the applicant. This image is displayed simultaneously with at least some of the information entered about the applicant. Additionally, one or more sections of the image are required to be displayed in an emphasized form to correspond to certain sections of the applicant's own information. By structing the user interface in the disclosed manner, the embodiments operate to solve the problems in the traditional technology by enabling the application process to be more efficient and user friendly.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 9 illustrates how dashboards for multiple selected products or services may be displayed simultaneously with one another.

FIG. 10 illustrates another example scenario in which dashboards for multiple selected products or services are displayed simultaneously with one another.

FIG. 11 illustrates an example user interface structured or laid out to enable an applicant to enter personal information.

FIG. 13 illustrates a resulting view of auto-populated information that is extracted from the applicant's ID.

FIG. 14 illustrates another view of the applicant's information, as well as a visual display of the applicant's ID.

FIG. 16 illustrates information that may be collected for the beneficiary.

FIG. 22 illustrates another authentication workflow step that may be performed to verify the identity of the applicant.

DETAILED DESCRIPTION

Embodiments disclosed herein relate to systems, devices, and methods that operate to effectively eliminate the barrier to entry associated with initially utilizing the products and services offered by a credit union. In particular, the disclosed embodiments provide for a streamlined workflow process that enables applicants to readily and easily obtain membership with a credit union in a manner such that the barrier to entry is effectively nullified.

In some embodiments, a user interface is presented, where the user interface is specifically designed to have a particular visual layout structured to facilitate progression of the membership application workflow. The workflow causes the user interface to display a membership account selection option for selecting a type of membership account. The user interface also displays a product selection option to enable the applicant to select a product type to initiate. The user interface also displays an applicant information option. Based on information entered in the applicant information option, there is then a determination as to whether the applicant is eligible for membership with the credit union. Notably, the user interface is required to visually display an image of an ID of the applicant. This image is displayed simultaneously with some of the information entered about the applicant. Furthermore, one or more sections of the image are required to be displayed in an emphasized form to correspond to certain sections of the applicant's own information.

Examples of Technical Benefits, Improvements, and Practical Applications

The following section outlines some example improvements and practical applications provided by the disclosed embodiments. It will be appreciated, however, that these are just examples only and that the embodiments are not limited to only these improvements.

Figure 1:
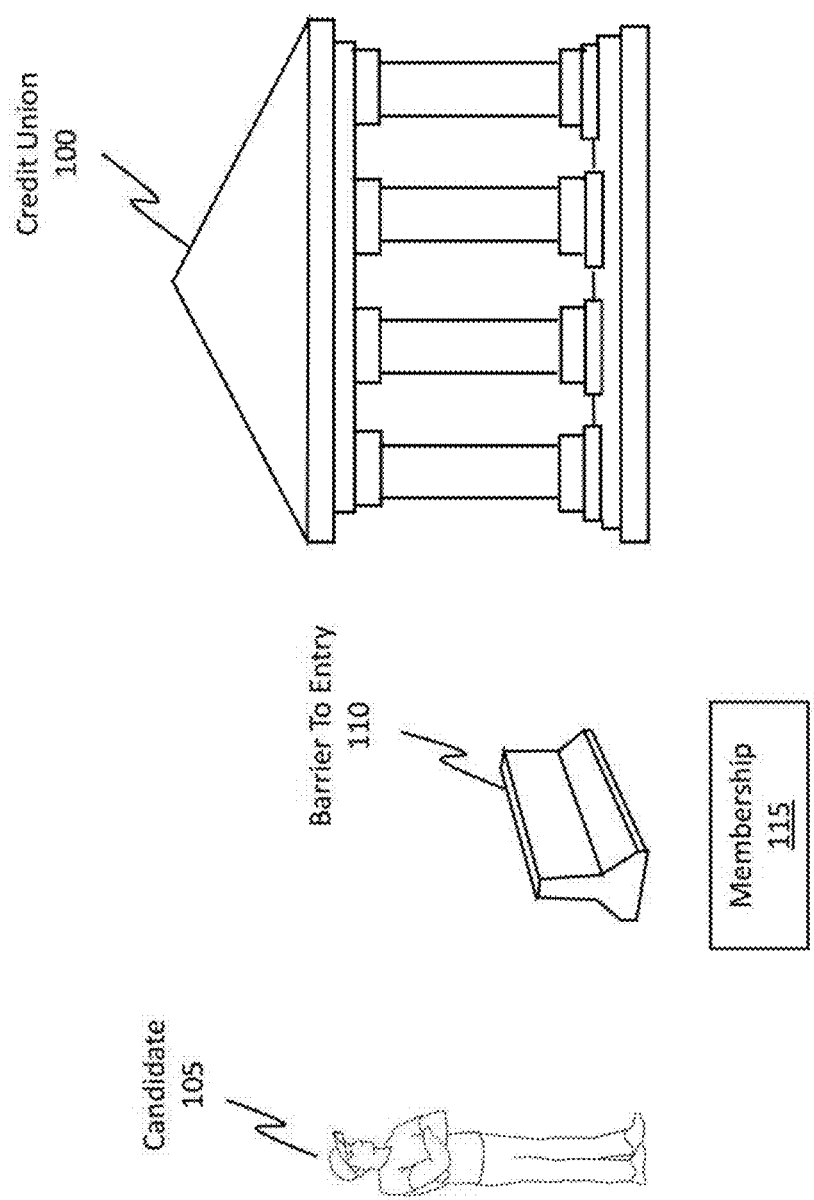
FIG. 1 illustrates how credit unions are different from many other types of financial institutions because of the requirement of membership.

FIG. 1 previously illustrated how candidates/applicants (e.g., candidate 105) are faced with a barrier to entry 110 in utilizing the products and services offered by a credit union (e.g., credit union 100). This barrier to entry 110 is a membership 115. Previously, the process to obtain a membership with a credit union was wrought with frustration because of the amount of time required to go through the membership application process. Additionally, candidates were often unaware as to what documentation they needed to complete the application process, and candidates were even often required to visit a credit union in-person to complete the process.

The disclosed embodiments bring about substantial benefits and advantages to the credit union application process. In particular, this disclosure presents an efficient and streamlined workflow process by which candidates or applicants can now follow in order to readily obtain a membership with a credit union. Such efficiencies are achieved through the use of intelligent workflow processes operating in conjunction with an interactive, specially structured user interface. This specialized user interface provides up-to-date (i.e. fresh) information for applicants to review, select, and/or approve. Additionally, the disclosed workflow processes operate to systematize and parameterize the application process so new implementations or instances of the user interface are easy for new credit unions to configure.

To clarify, one of the major hurdles with utilizing the products and services of a credit union is that credit unions require users to be members in order to have an account/share or to access services, whereas a bank or other financial institution does not require membership. With a bank, if client wants a checking account, the client can often immediately get an account. The disclosed principles are, therefore, focused on a scenario specifically involving credit union application processes.

The disclosed embodiments beneficially minimize this membership "barrier to entry" so that a credit union can be as competitive as any other financial institution in the marketplace. To minimize this barrier to entry, the embodiments perform a number of operations. One operation involves providing an improved and intelligent workflow process in which there are defined a number of workflow process steps delineating how to onboard a nonmember to become a member with an account/share.

Another operation involves the way in which the back-office part of the membership application is handled. In some implementations, the system logs the steps that are involved when a candidate starts a new membership application. Beneficially, the system maintains a series of queues and abstract data structures recording and monitoring the application process. By way of example, if an applicant was 100% successful in the application process, then that applicant's application is placed in a "completed" queue. If the applicant started an application but stopped before finishing the application, then the application is placed in an "incomplete" queue. If the application is started but the applicant did not qualify for membership, the application is placed in yet another queue. If an application was started but funding could not be obtained, then that application is placed in yet a different queue. The entire process of managing queues and creating follow-up points is singularly unique and provides substantial benefits to how applications are both maintained and completed.

Some additional benefits and technical improvements provided by the disclosed embodiments include, but are not limited to, the ability to provide an enhanced visual aspect to the application process via a specially structured user interface providing improved interactions with a user/applicant; the ability to parameterize and systematize the software so it can be configured without requiring a significant amount of custom programming (e.g., the application manager software can go through parameters and systems to readily configure a base installation or instance of the software for specific credit unions without having to code or recode every line of code); and the ability to provide enhanced and refined "back-office" pieces for enhanced reporting, enhanced queue management, and enhanced follow up capabilities.

The combination or aggregation of these workflow processes and user interface elements lead towards solving the problems in the existing technology. That is, the disclosed embodiments solve problems that other financial institutions do not have but which credit unions do have, namely, a requirement to be a qualified member before obtaining services. The disclosed unique workflows enable the collection of an applicant's personal information, enable the making of an intuitive and easy to navigate user interface in order to obtain that information quickly, and enable the opportunity to automatically qualify an applicant for membership and to allow that applicant to select products or services, receive electronic disclosures, or even to collect digital signatures. The combination of how these constructs work provide an extremely efficient and powerful tool and effectively eliminate the credit union-unique membership obstacle.

Previously, collecting the required information for a membership application was a very laborious process that consumed a significant amount of time (e.g., often exceeding 20 minutes). Through practice of the disclosed principles, however, this application process can be reduced to as little as five minutes or less, and a human hand may not be required to process the application or to grant membership. Indeed, the entire membership granting process may now be fully automated.

The disclosed embodiments beneficially provide decision engines to decide whether an application qualifies for membership. The embodiments also provide decision engines or logic to determine whether an applicant can be extended certain types of services or products (e.g., checking accounts/shares, loans, etc.). The software can be used in-house so that credit union employees can use the software when a candidate walks into the brick-and-mortar credit union building and can also be used remotely over the Internet (e.g., via a mobile phone on a web browser or via any other type of portable or non-portable device). The disclosed embodiments can be implemented to support any type of account/share, including business accounts/shares, trust accounts/shares, savings accounts/shares, or any other type of account/share. Credit unions typically use the term "share" when referring to a product (e.g., a checking share or a savings share). As used herein, however, the terms "share" and "account" are interchangeable with one another and generally refer to a financial relationship a member has with a credit union.

Accordingly, the disclosed embodiments are generally focused on solving problems on how to streamline a membership application process to acquire and aggregate client-side information in order to automatically approve clients for membership and to obtain an account/share with the credit union. The embodiments effectively reduce or seemingly eliminate the barriers to entry that are created through the unique credit union model that are created in the United States so that credit unions can have an equal chance of getting new account/share holders and new member owners without it seeming as though there is a barrier slowing them down to becoming an account/share holder. The embodiments present a specific type of user interface that provides a number of prompts or fields that are customized or tailored in order to prompt the client to enter different pieces of information to streamline the process.

Accordingly, significant benefits and advantages may be realized through the practice of the disclosed principles. For instance, the disclosed embodiments include a specially designed user interface (UI) configured or structured in a specific manner so as to improve the visual display of information and to improve how a user interfaces with the computer system. The layouts provided by the disclosed UIs are configured in a specific manner to address problems related to the technical field by providing improved visual layouts for displaying and manipulating applicant data. Additionally, the disclosed embodiments provide a technical solution to the technical problem of streamlining and automating membership processes. Accordingly, substantial benefits and advantages may be realized from the practice of the disclosed embodiments.

It should be noted that the disclosed user interface may operate on any type of web browser, without limit. Furthermore, no additional plugins or add-ons are required to execute the disclosed user interfaces.

Client Database Manager

Figure 2:
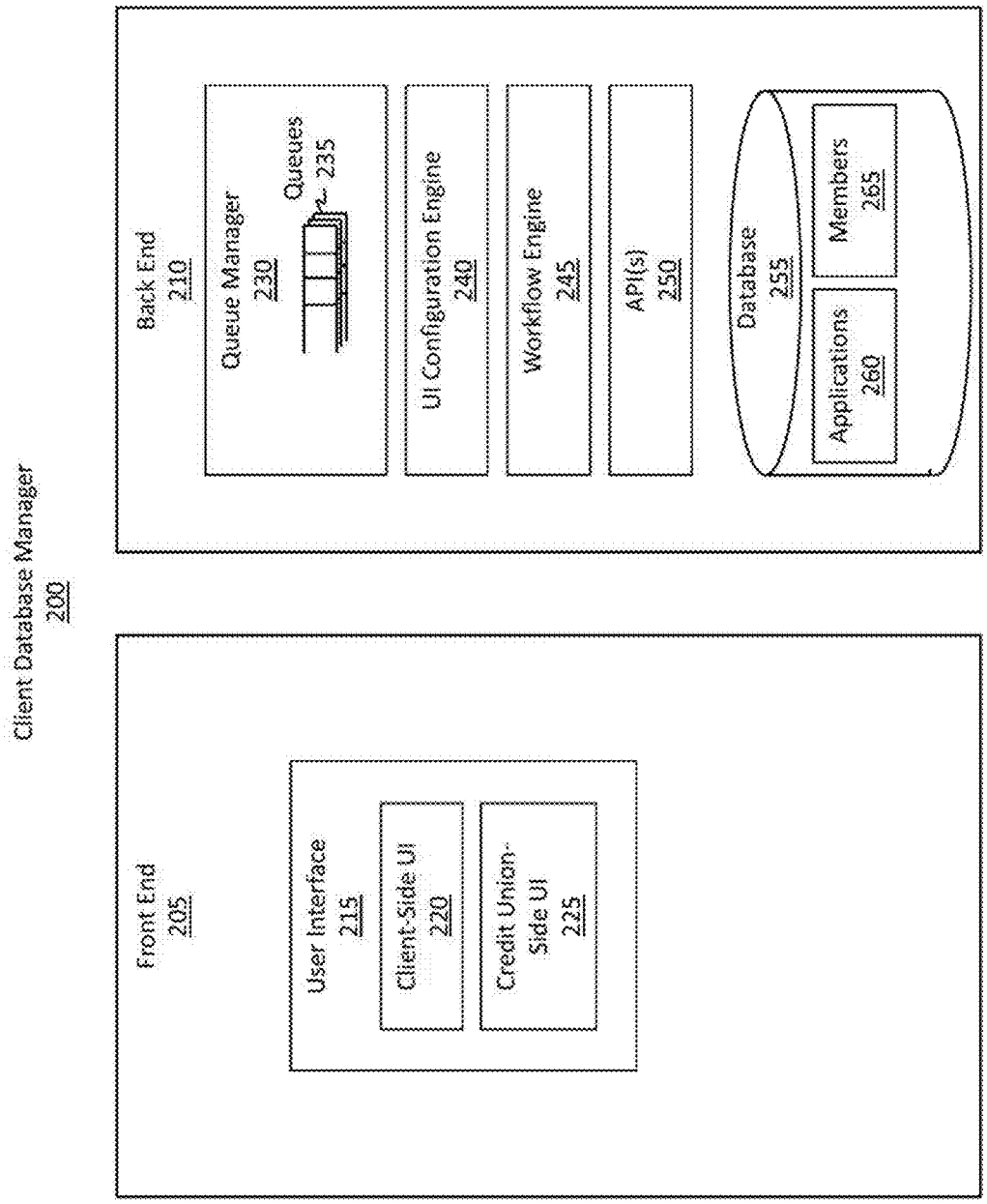
FIG. 2 illustrates an example of an architecture or client database manager configured to provide streamlined workflow processes for enabling applicants to become members of a credit union in a quick and efficient manner.

With that understanding, attention will now be directed to FIG. 2, which illustrates an example client database manager 200 configured to provide the benefits and advantages described above. Client database manager 200 is shown as including both a front end 205 and a back end 210.

The front end 205 is client or applicant facing (or even employee facing) and is configured to provide a user interface 215. In some cases, the user interface 215 may be a client-side UI 220 or a credit union-side UI 225. With the client-side UI 220, a client using any type of computing device (e.g., a mobile phone, tablet, desktop, laptop, or even a wearable device) accesses the user interface 215 to initiate an application for membership with a credit union. To clarify, with the client-side UI 220, the client or applicant him/herself completes the application process. In contrast, the credit union-side UI 225 may be a UI utilized by a credit union employee who completes the membership application on behalf of an applicant. Additional details regarding the user interface 215 and the specialized layout of that user interface 215 will be presented later.

The back end 210 is shown as including a number of different constructs, including a queue manager 230, which manages any number of queues 235, a UI configuration engine 240, a workflow engine 245, and an application programming interface (API) 250. The back end 210 may also include or be associated with a database 255, which includes records or logs data structures detailing any number of applications 260 and/or members 265 (i.e. member records).

As described previously, applications may be assigned or placed into a particular queue based on the level of completion of that application as well as characteristics associated with a reason as to why an application was not completed. By way of example and not limitation, an application may have been saved for later completion and thus is only partially complete. An application may have been rejected because an applicant failed to comply with the credit union membership rules, or an application may have been rejected because of funding issues. For each one of these different categories or types of applications, a respective queue (e.g., queues 235) may be initialized to track and maintain the application.

Queues 235 are beneficial for a number of reasons. For example, by initializing different queues for each category or type of application (e.g., completed, partially completed, failed for funding, failed for qualification, etc.), the embodiments are able to differentiate between different applications depending on their levels of completion, or rather their respective statuses. Each queue may have associated with it a reminder or alert engine that may trigger an alert to the applicant and/or the credit union to inform the respective entity (i.e. the applicant and/or the credit union) of the application's current status. For instance, if an application has a status of "partially completed," the alert engine may trigger an alert to be transmitted to the applicant on a periodic schedule to remind the applicant that his/her application needs to be completed in order to engage with the credit union. Of course, the periodicity or frequency of these alerts may be set to any value, such as, but not limited to, an established number of hours, days, weeks, months, or even years.

A progressive or tiered alerting schedule may be implemented. For instance, when an application is first indicated or flagged as being partially completed, the alert engine may trigger alerts every selected number of hours or days. If no response is received from the applicant, the alert engine may progressively reduce the number of alerts so that alerts are sent a selected number of days then a selected number of months and then potentially even a selected number of years. Additionally, an alert may be triggered on the yearly anniversary when an application was first started. Accordingly, a tiered approach to triggering alerts may be used to inform an applicant regarding the current status of his/her application. Such alerts may be provided for any application having any status, without limit. By maintaining applications in respective queues, the embodiments are able to beneficially track and monitor the statuses of different applications. The alerts may be sent by any means, including via text message, email, or even a letter in the mail.

The UI configuration engine 240 is structured or configured to enable modifications or customizations to be performed on the user interface 215. Often, it is the case that different credit unions will request or require different features for their respective instances of the user interface 215. In this regard, the user interface 215 can be considered to be a type of multi-tenant user interface, where each tenant's instance of the user interface 215 may be modified or customized based on individual credit union preferences.

The UI configuration engine 240 is structured to enable discrete modifications to be performed on a tenant's or credit union's specific instance of the user interface 215. By way of example and not limitation, the UI configuration engine 240 includes options to modify visual features of the user interface 215, such as color, placement of UI elements, logos, messages, and so forth. Additionally, the UI configuration engine 240 allows for credit union unique promotions/promos, products, or services to be visually displayed on the credit union's instance of the user interface 215. By way of example, one credit union may offer a special type of credit card with certain credit features while another credit union may offer a different type of credit card and different credit features. The UI configuration engine 240 can be used to modify each credit union's UI instance to reflect these variations.

The workflow engine 245 is configured to manage the application workflow processes. Such workflow processes may include specific requirements each credit union may require in order to obtain membership with that credit union. By way of example, one credit union may require the collection of one type of information (e.g., perhaps social security information or a tax ID) while another credit union may require the collection of a different type of information (e.g., perhaps driver's license information or a state ID). The workflow engine 245 provides the ability to modify which workflow or which process is to be followed to enable an applicant to gain membership with a particular credit union. In this regard, the workflow engine 245 may be customized to reflect the specific membership application requirements for a particular credit union.

The API(s) 250 are provided in the back end 210 to enable the client database manager 200 to interface with a specific credit union's server or system (i.e. the credit union's so-called "core," as used herein). After receiving the applicant's information, the API(s) 250 may be used to format or otherwise structure the collected data in a manner so as to comply with a credit union's particular formatting or structuring requirements. Additionally, the API(s) 250 may be used to transfer the collected data to the credit union's server.

The database 255 may be structured to include any type of information, including any type or number of applications 260 as well as information about the credit union's members 265. The applications 260 may be tagged, flagged, or otherwise have their metadata marked so that those applications 260 will be categorized into the different queues 235 mentioned earlier.

FIG. 300 illustrates an example abstract data structure 300, which may represent a structure for organizing data used by the database 255 of FIG. 2. That is, the applications 260, or rather the information included in those applications 260, may be managed by the database 255 using the abstract data structure 300 as well as the members 265 information. One will appreciate how the abstract data structure 300 may be any type of data structure, including, but not limited to a hierarchical tree comprising nodes and links, arrays, lists (both linear lists and non-linear lists), queues, graphs, linear, non-linear, homogenous, non-homogenous, static, or even dynamic data structures. Indeed, any type of data structure may be used to maintain membership application data.

In some embodiments, the abstract data structure 300 includes information about a candidate/member 305. This information may include, but is not required to include, personal and contact information 310. Any number of records 315 may be included in the personal and contact information 310 such as, but not limited to, the candidate or member's name, address, telephone number, email address, and so forth. Each piece of information may be maintained as a separate line item or a separate record under a corresponding heading or category (e.g., the personal and contact information 310 category under the parent node candidate/member 305).

The information may include other data as well, including membership information 320 (e.g., account/share number, account/share type, account/share age, account/share activity, frequency of use, credit information, etc.), membership product details 325 (e.g., which types of accounts are being used), employment information 330 (e.g., information about the candidate/member's employer or place of employment), and even other identification information 335 (e.g., verified driver's license, social security number, passport number, and so forth). Any number of records may be included in each of these different sub-nodes or categories in the abstract data structure 300. Accordingly, the database 255 from FIG. 2 in conjunction with the abstract data structure 300 operate to provide structure to data collected from an applicant or member to enable efficient searching, processing, and data management. In this regard, the database may maintain membership applications, and the database can use an abstract data structure to organize the membership applications.

Improved Workflows for Automatically Processing Membership Applications

Figure 4:
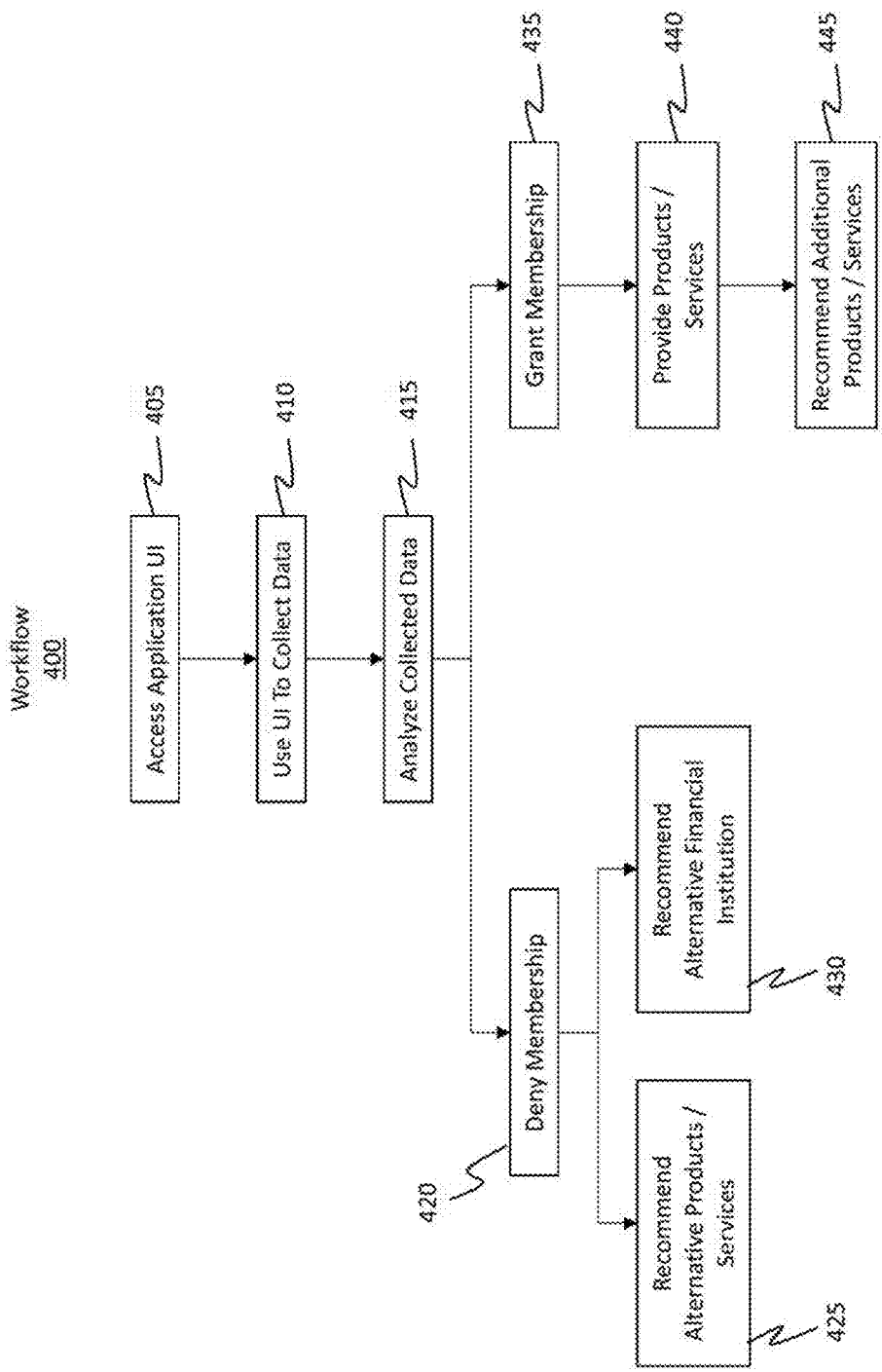
FIG. 4 illustrates some high-level processes of the disclosed workflow for guiding an applicant in the membership application process.

The client database manager 200 of FIG. 2 is able to perform the workflow 400 processes illustrated in FIG. 4. FIG. 4 provides a high-level overview of the disclosed workflow processes whereas a detailed description of the processes will be recited in connection with FIG. 5 through 23. As such, FIG. 4 is provided for introductory example purposes. By way of example and not limitation, the workflow 400 includes, but is not limited to, an initial act (act 405) of accessing an application user interface (UI), such as the user interface 215 of FIG. 2. This UI may be provided to a prospective member or applicant who is desirous to obtain a membership with a credit union.

Figure 3:
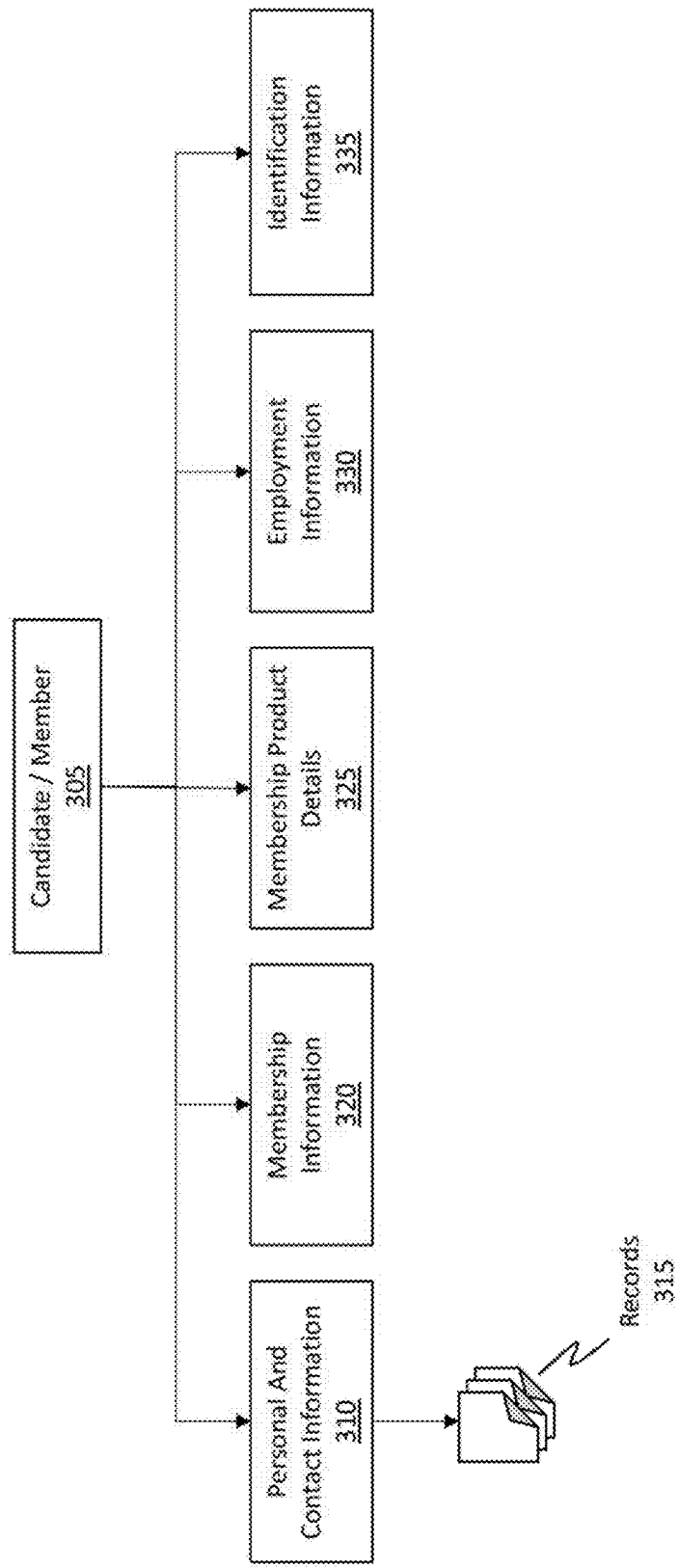
FIG. 3 illustrates an example of an abstract data structure that may be used to provide structure to data collected from an applicant.

The UI may then be used to collect the applicant's data (act 410). This collected data may include the personal and contact information 310 from FIG. 3 or any of the other types of information described in connection with FIG. 3 and the other portions of this disclosure. The collected data is used to make a determination as to whether or not the applicant qualifies for membership with the credit union, based on a comparison of the applicant's collected data against the rules, bylaws, charters, and other requirements outlined for membership. By structuring or organizing the collected data into so-called "structured" data using the abstract data structure 300 from FIG. 3, then this comparison may be performed automatically and in an efficient manner.

Workflow 400 also includes an act (act 415) of analyzing the collected data to determine membership. In some cases, an initial prediction may be performed to generate a prediction metric to initially provide a prediction regarding the likelihood of successfully obtaining a membership. In any event, during this analysis phase, the embodiments compare the applicant's data against membership criteria. If the applicant's data satisfies a threshold number of membership criteria, then the applicant will be permitted to become a member. Otherwise, the applicant will be rejected and not permitted to be a member.

For instance, workflow 400 is shown as including an act (act 420) of denying membership when the applicant's data fails to comply with the credit union's membership criteria. Once membership is denied, then the workflow 400 may optionally include one or more additional operations, such as by providing (act 425) a recommendation of alternative products/services offered by the credit union (e.g., perhaps the applicant's data failed to satisfy the criteria for a particular product, but the applicant's data may qualify the applicant to utilize a different product). Additionally, or alternatively, workflow 400 optionally includes an act (act 430) of recommending an alternative financial institution to the applicant based on the applicant's collected data. For instance, the embodiments may optionally recommend a particular banking chain or loan provider based on attributes extracted or identified from the applicant's data.

On the other hand, if the applicant's data does satisfy a threshold number of membership criteria, then the workflow 400 is shown as granting membership (act 435) to the applicant. In response to this new membership, the applicant, now a member, is provided with the opportunity to utilize the products and services offered by the credit union (act 440). As will be discussed in more detail later, the barrier to entry in obtaining this membership is significantly reduced or even effectively eliminated as a result of the use of a specialized user interface used to progress through the application process.

As another option, the workflow 400 may include an act (act 445) of the system, or rather the client database manager, of providing recommendations regarding additional or specific products and services the member may be interested in obtaining. That is, in some cases during the application process, an applicant may mark, flag, or otherwise provide an indication of a particular product or service the applicant would like to utilize. In addition to this initial product or service, the client database manager is able to submit additional recommendations that may be useful to the client, such as additional checking accounts, saving accounts, money market accounts, credit cards, certificates of deposit, or even loan offers. Based on the applicant's collected data, the applicant may actually qualify for special loans. The embodiments are able to identify and recognize such occurrences and provide promotions or offers to the member.

It should be noted that specific steps of the workflow processes are not necessarily required to be implemented in the order presented in the workflow 400 or even in the workflow described next in relation to FIGS. 5 through 23. Indeed, the disclosed embodiments are flexible and the workflow steps may be implemented in various different orders or manners, without limit. Additionally, it should be noted that the following user interface structures and visual illustrations are fully customizable in appearance (e.g., color, layout, etc.) and workflow order. In some embodiments, each respective credit union will be provided with its own instance of a workflow user interface, and the credit union will be provided the ability to customize the user interface in accordance with the credit union's own setup and design criteria by having access to the back end of the client database manager (e.g., the UI configuration engine 240 from FIG. 2).

User Interface Workflows for Improving
Application Processing Efficiency

Having just described some of the general workflow processes that the embodiments are able to perform, attention will now be directed to FIGS. 5 through 23. These figures illustrate various views of an example user interface specially configured to solve the problems prevalent in the technical field. In particular, this user interface includes user interface elements that are placed or structured in a specific visual layout designed to improve how the applicant interacts with the computer system during the membership application process. By configuring the user interface in the disclosed manner, the embodiments help facilitate, or rather improve, not only the visual display of the information, but they also improve how data is gathered and collected from the applicant. By efficiently collecting data in the manner described herein, the operations of the computer system will be improved because the application process will be streamlined and made more efficient over traditional techniques. Even further, the layout of the disclosed user interface is specifically designed to solve the inefficiencies prevalent in traditional application processes. By configuring the layout in the disclosed manner, the embodiments provide a robust, efficient, and streamlined data collection and processing mechanism. It should be noted that the user interface features and elements disclosed in FIGS. 5 through 23 may be combined with one another and are not mutually exclusive. That is, any user interface element from one figure may be combined with any one or more other user interface elements from any of the other figures, without limit.

Figure 5:
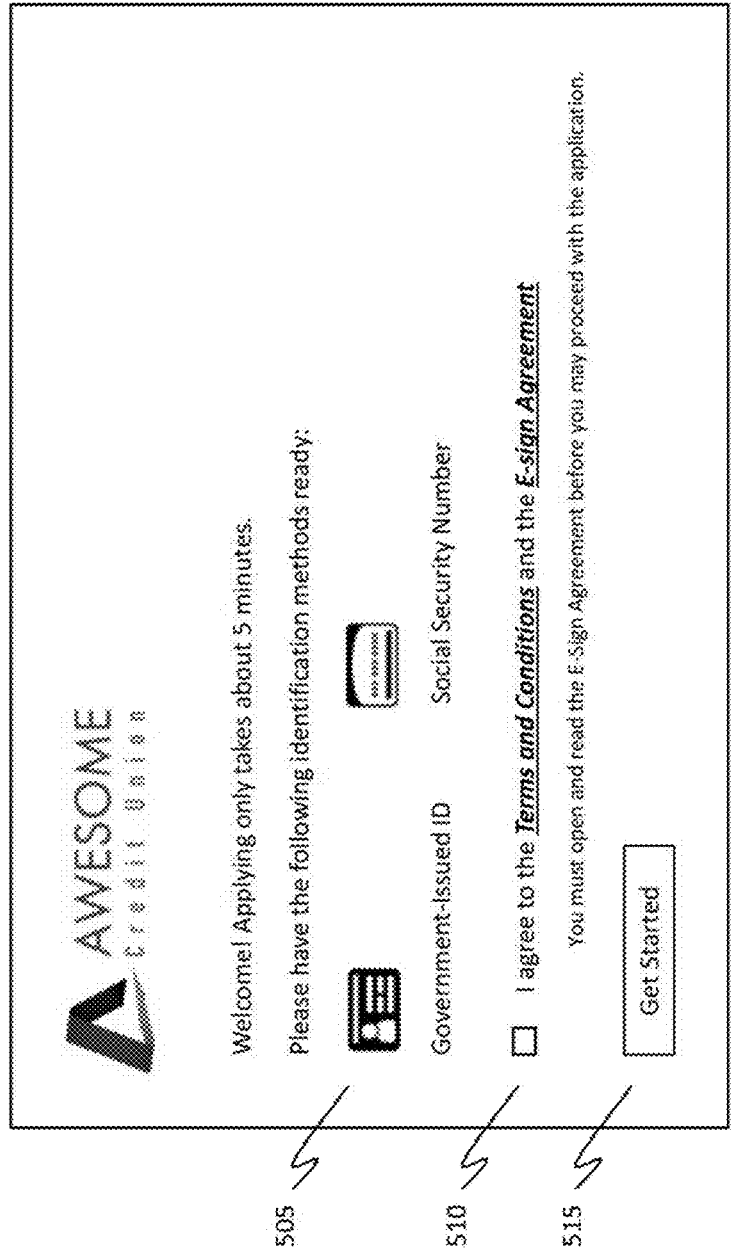
FIG. 5 illustrates an example user interface for initiating the workflow for enabling an applicant to become a member.

Accordingly, attention will now be directed to FIG. 5, which illustrates an example user interface 500 for efficiently performing at least a part of the workflow 400 of FIG. 4. To clarify, the user interfaces depicted in FIGS. 5 through 23 generally represent the workflow 400 of FIG. 4. For instance, the user interface 500 may be the user interface recited in act 405 of workflow 400. Additionally, user interface 500 may be the user interface 215 from FIG. 2.

Initially, user interface 500 includes a welcome message detailing some of the benefits provided by user interface 500 and workflow 400 of FIG. 4. In particular, user interface 500 immediately points out how quick the membership application process can be (e.g., about only 5 minutes in duration). By having such a reduced or low time requirement to complete the membership application, the disclosed embodiments effectively eliminate the hurdle or barrier to entry associated with utilizing the products and services offered by a credit union. Of course, such messages are fully customizable based on credit union design preferences.

User interface 500 also includes a preparation section 505 listing which items will be needed to complete the membership application. To clarify, the preparation section 505 includes a list of documentation or other requirements that each particular credit union may require in order to complete that credit union's membership application. In this particular example, the preparation section 505 lists that a government-issued ID (e.g., a driver's license, state ID, military ID, passport, etc.) and a social security number (e.g., to perform a $3^{rd}$ party background check or credit report) will be required in order to complete the membership application. Of course, other credit unions may require additional or fewer documentation. As such, the user interface 500 may be configured via the UI configuration engine 240 so that each instance of the user interface 500 may correspond to each respective credit union's application process.

In some embodiments, the user interface 500 not only includes text detailing the required documentation, but it also includes a visual illustration of the required documentation. For instance, the preparation section 505 not only includes the text "Government-Issued ID" and "Social Security Number," but it also includes a corresponding visual representative of a driver's license and a social security card. The combination of the visual with the text help ensure the applicant will find the correct documentation. In some cases, the embodiments are able to analyze the applicant's current device to identify the device's IP address. Once this IP address is determined, then the embodiments may identify a geographic region, and in particular a specific United States state, in which the applicant's device is currently located. Based on the identification of the state, the embodiments may then obtain (e.g., by conducting an automated Internet search) a copy or template image of that state's driver's license or state ID. That template image may then be displayed in the user interface 500. As such, the embodiments are able to customize the user interface 500 based on the current location of the applicant. Alternatively, the embodiments are able to display the state's ID or driver's license for the state in which the specific credit union is located regardless of the applicant's current location.

The user interface 500 also includes a hyperlink to the "Terms and Conditions" of the credit union as well as a hyperlink to an "E-sign Agreement." The E-sign agreement is a legal document granting the user interface, or rather the client database manager, permission to acquire the applicant's data and to retain that data in a secure database, such as database 255 of FIG. 2. In order to proceed with the application process, the applicant may be required to select each one of the hyperlinks (i.e. open up the corresponding documentation) and also select the checkbox 510 next to the hyperlinks to verify that the applicant is aware he/she is completing a credit union membership application. In other words, the applicant may be required to select the Terms and Conditions and the E-sign Agreement in order to proceed with the workflow. Selection of the hyperlinks may result in a new web browser tab being opened so as to display the corresponding documentation or, alternatively, a downloadable document (e.g., a pdf) may be downloaded to enable the applicant to view the documentation. Each respective credit union may have its own corresponding set of Terms and Conditions and E-sign Agreement.

Once the hyperlinks and checkbox 510 have been selected, the "Get Started" button 515 will become available for selection to proceed with the application process (e.g., the button may have been previously unselectable). In some embodiments, the "Get Started" button 515 may initially be displayed in one format, and then the format may change once the hyperlinks and checkbox are selected. For instance, the "Get Started" button 515 may initially be displayed in a de-emphasized form, such as greyed out or perhaps it may not even be displayed. Once the hyperlinks and checkbox are selected, however, the "Get Started" button 515 may be emphasized (e.g., no longer in a grayed-out form) or may be visually displayed. Accordingly, selection of the "Get Started" button 515 will allow the workflow to proceed to the next step, which is illustrated in FIG. 6.

Figure 6:
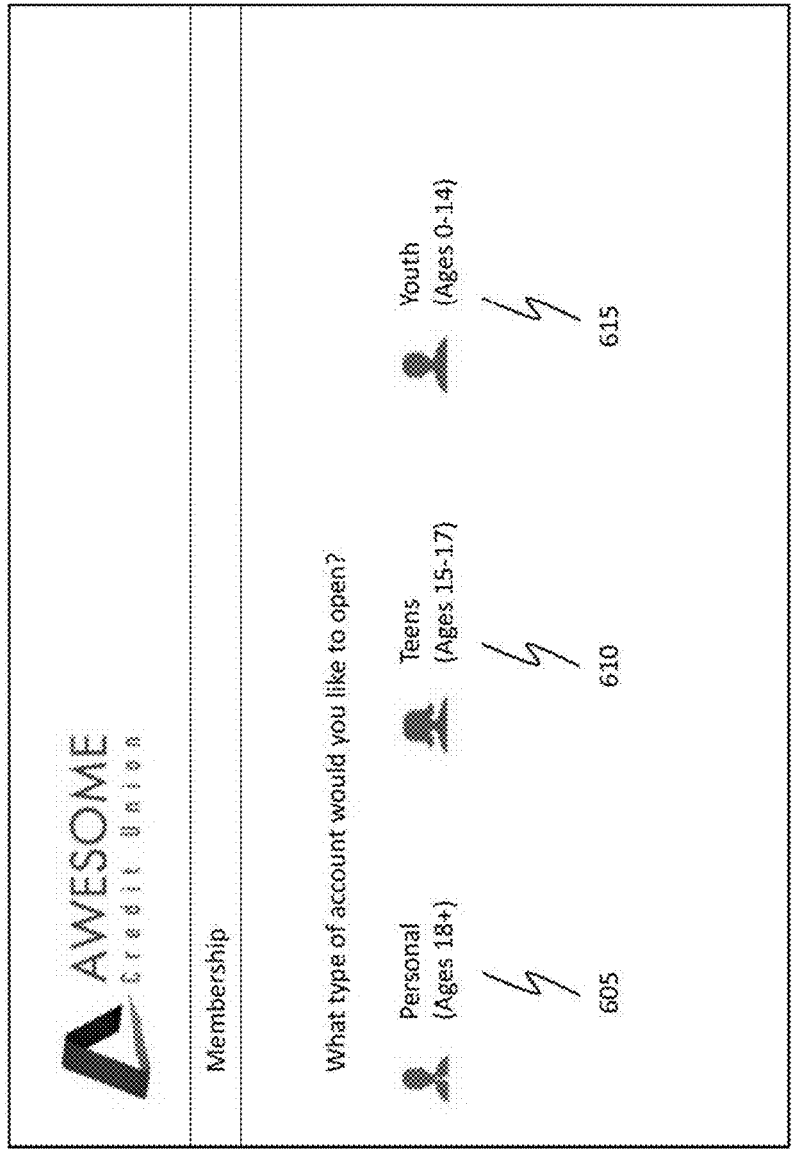
FIG. 6 illustrates an example user interface structured to enable an applicant to select a specific type of membership relationship, share, or account with the credit union.

FIG. 6 illustrates an example user interface 600, which is associated with the user interface 500 of FIG. 5 and which represents the next step in the workflow embodied or represented by FIG. 4 and FIGS. 5 through 23. As shown, user interface 600 is presenting the applicant with a number of different options for obtaining a membership with the credit union, where the options are dependent on characteristics associated with the applicant based on the applicant's age. For instance, if the applicant is 18 or older, as represented by option 605, then the applicant may potentially obtain a "Personal" membership account/share with the credit union. If the applicant is within the age range of 15-17, as represented by option 610, then the applicant may potentially obtain a "Teens" membership account/share with the credit union. If the applicant is within the age range of 0-14, as represented by option 615, then the applicant may potentially obtain a "Youth" membership account/share with the credit union.

Different products and services will be available to the applicant based on the type of membership account he/she has with the credit union. By way of example, a Youth membership account may be limited to only a checking account with the credit union while a Personal membership account may have no limits on the types of products or services the applicant may use. Accordingly, different restrictions may be placed on the availability of products or services based on the applicant's membership type (e.g., Personal, Teens, or Youth). Other restrictions may be set in place as well, such as potentially the requirement that a parent's account be tied to either a Youth membership account or the Teens membership account. Restrictions on the amount of withdrawals may also be imposed on either the Youth or Teens membership accounts. Of course, the number and types of restrictions may be customized based on any established criteria.

Additionally, based on the selection of the membership account type, the general workflow will remain the same but a few configuration changes may be implemented to address specific requirements or features related to each one of the different account types. For example, a first set of products may be visually displayed as being options for the Personal membership account, a second set of products may be visually displayed as being options for the Teens membership account, and a third set of products may be visually displayed as being options for the Youth membership account. The first set of products may be fully expansive or inclusive while the second and third sets of products may be a reduced set of products.

Another difference in the types of accounts is that the Teens membership account and even the Youth membership account workflow processes may accept a different type of identification. For instance, whereas the Personal membership account may require a government-issued ID, the Teens and Youth membership accounts may be configured to accept a school ID as a valid ID.

While only three membership account types are currently listed, one will appreciate that any number or type of membership accounts may be used. Furthermore, the age ranges may be customized to fall within any age range, without limit. Each instance of the workflow or user interface, where different credit unions use a different instance, may be customized to suite the requirements of each respective credit union. Additionally, it should be noted that the icons and/or text illustrated in user interface 600 for each membership account type is selectable. Selection of any one of the different membership account types will trigger the workflow to proceed with the next workflow step, which is illustrated in FIG. 7.

Figure 7:
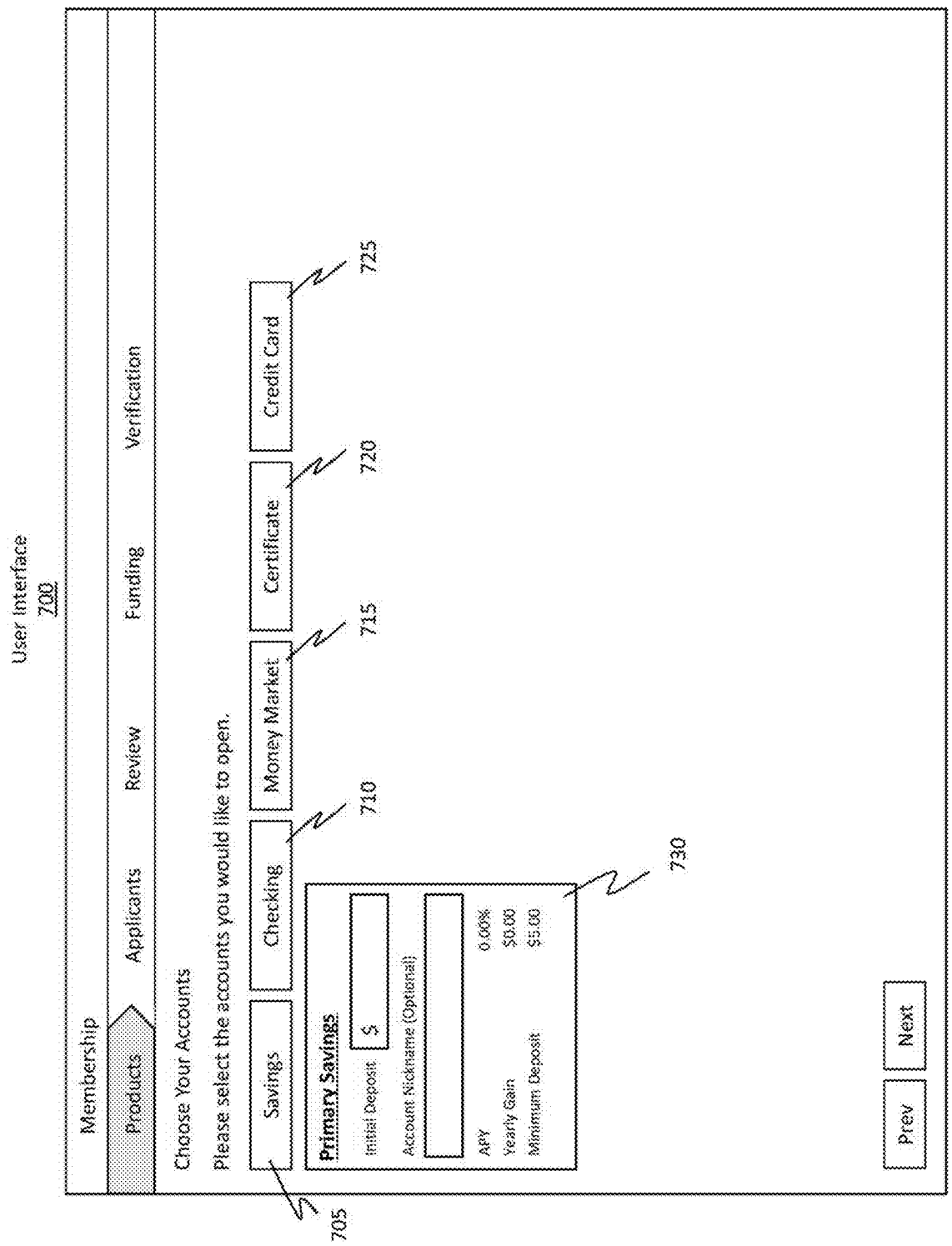
FIG. 7 illustrates an example user interface structured to enable an applicant to select different products or services.

FIG. 7 illustrates an example user interface 700 structured to enable an applicant to select different products and services offered by the credit union. As discussed previously, the availability of the different products and services may be limited depending on the type of membership account that was selected in the user interface 600 of FIG. 6. Supposing the Personal membership account type was selected, the availability of products and services may be unlimited whereas the availability of selected ones of the products and services may be limited for either the Teens or Youth membership account types. In this example, the Personal membership account type was selected, so there is no initial limitation on the availability of products and services.

Initially, user interface 700 is shown as including a listing of products and services. In this example, the listing includes a savings account 705, a checking account 710, a money market account 715, a certificate of deposit 720, and a credit card 725. Each of these user interface elements is selectable. When selected, a corresponding dashboard will be visually displayed in the user interface 700. By default, the primary savings dashboard 730 corresponding to the savings account 705 is visually displayed. Of course, the default setting may be changed so that any other dashboard may be displayed by default in place of the primary savings dashboard 730.

Here, the primary savings dashboard 730 is shown as including a number of different user interface elements. These elements include an option to make an initial deposit into the primary savings account and an option to name, or rather nickname, the primary savings account. The dashboard 730 also visually displayed the annual percentage yield (APY), the yearly gain, and the minimum deposit requirement to set up a primary savings account (i.e. performance information). Accordingly, each respective dashboard will list features and requirements associated with the corresponding product that was selected in order to trigger the display of the dashboard.

The workflow step illustrated in FIG. 7 includes the opportunity or the option to select credit union products or services. In this case, the products or services include savings accounts, checking accounts, money market accounts, certificates of deposit, and credit cards, but one will appreciate how any other products or services provided by a credit union may also be visually displayed and selectable. When selected, a corresponding dashboard will also be displayed in the user interface 700. Each credit union is able to provide a customized set of products or services. As a consequence, the UI configuration engine 240 from FIG. 2 may be used to customize each credit union's instance of the workflow and user interface.

The user interface 700 may be configured to allow any number of products or to restrict the number of products that are selectable. For instance, restrictions may be in place to allow only a single savings account, whereas the applicant may be allowed to select multiple checking accounts or multiple credit cards. As another example, the user interface 700 may be configured to allow selection of multiple savings accounts but only a single checking account. It will be appreciated that when a new product is selected, a corresponding new dashboard will be visually displayed, as will be described in more detail later. By way of a brief introduction, however, suppose an additional savings account was desired by the applicant. By selecting the savings account 705, a new dashboard will be visually displayed next to or proximate to the dashboard 730. The display of two separate dashboards provides an indication to the applicant that the applicant has selected two different products, namely two different savings accounts. Accordingly, the user interface 700 may be configured to impose restrictions set by each credit union on the number of products an applicant may select.

Figure 8:
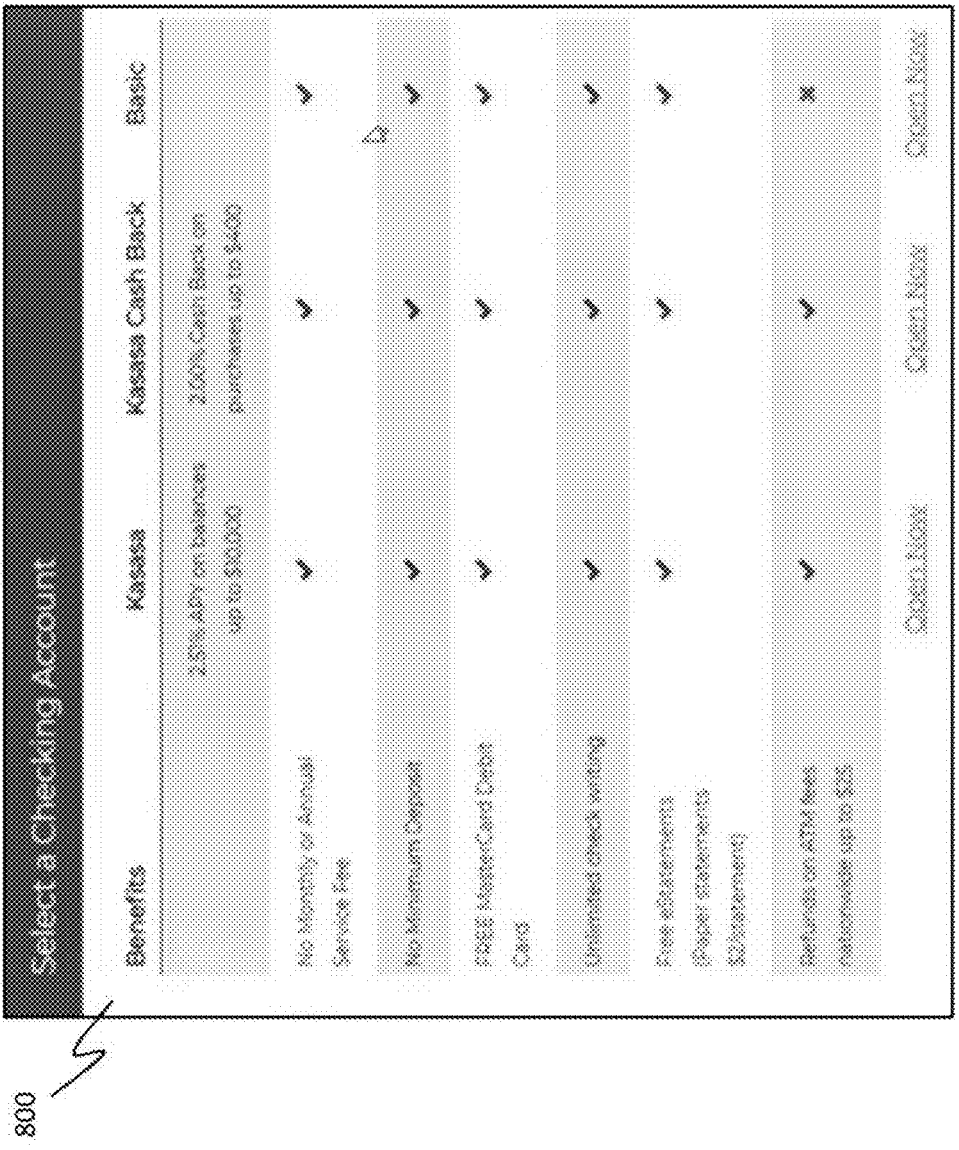
FIG. 8 illustrates a specific example of a checking share provided by a credit union.

Suppose, by way of example, the applicant selects the checking account 710 option. Selecting this option will trigger another step in the workflow, which step is visually displayed in FIG. 8. Specifically, FIG. 8 illustrates a selection dashboard 800 to provide options to the applicant regarding which specific type of checking account the applicant would like. To clarify, different credit unions may offer different types of checking accounts. By visually displaying the dashboard 800, the applicant is presented with a listing of the available types of checking account options.

In this specific example, there are three different types of checking accounts presented in the dashboard 800, namely, a "Kasasa" checking account, a "Kasasa Cash Back" checking account, and a "Basic" checking account. Of course, different credit unions will name their checking account types differently and may have a different number of available checking account types. Notably, however, the dashboard 800 is able to provide a quick comparison between the different features of each of the different types of checking accounts. For instance, the checkmarks or the "x" indicate whether or not the checking account type provides the listed feature (e.g., "No Monthly or Annual Service Fee"). Also, the dashboard 800 lists differences between the APY benefits.

Although the dashboard 800 is illustrated as being associated with a checking account, one will appreciate that similar types of dashboards may be visually displayed for any type of general category account (e.g., a savings account, a money market account, etc.) when those general category accounts include multiple options. For instance, the general category account labeled as "savings account" may actually have multiple different types of savings accounts available for the applicant to select. As such, a corresponding savings account dashboard, similar to dashboard 800, may be displayed to visually illustrate, compare, and contrast the different savings account options. Accordingly, the dashboard 800 is beneficially triggered for display when a scenario arises in which a general category account type has multiple account type options associated with it (e.g., multiple different types of savings accounts or multiple different types of checking accounts or multiple different types of money market accounts, etc.).

Continuing the original example, suppose the applicant selected the "Kasasa" checking account type by selecting the "Open Now" option for "Kasasa" at the bottom of the dashboard 800. In response to this selection, the workflow proceeds with displaying the user interface presented in FIG. 9.

Figure 9:
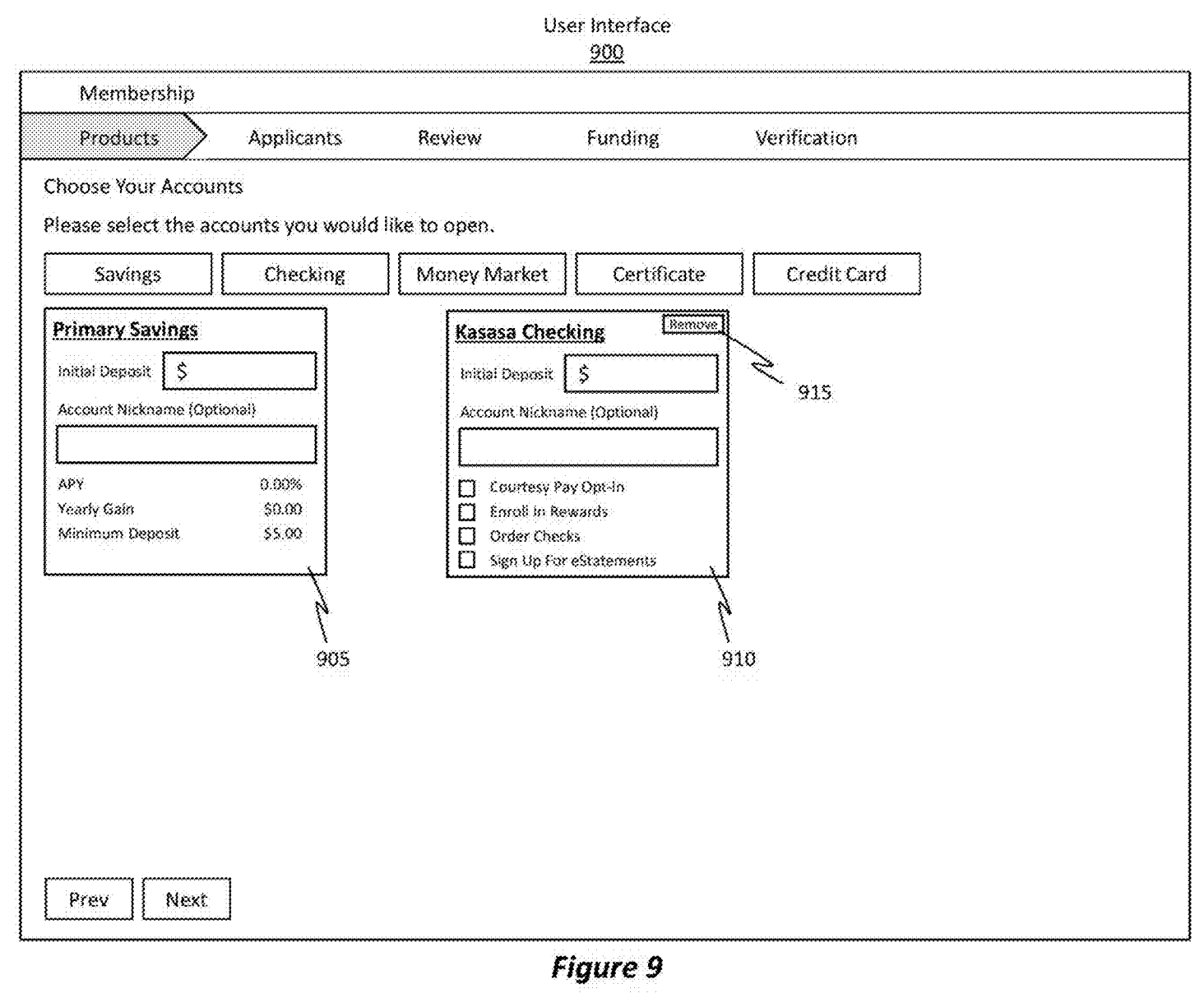

User interface 900 of FIG. 9 is an updated version of the user interface 700 from FIG. 7, where the update occurred as a result of the applicant selecting the checking account 710. Now, the user interface 900 is visually illustrating both the savings account dashboard 905 as well as a new checking account dashboard 910, which dashboard 910 corresponds to the selection made in the dashboard 800 of FIG. 8. From this user interface 900, the applicant is informed that he/she currently has two products selected to potentially acquire or utilize from the credit union.

Dashboard 910 is configured to display information related to features and characteristics associated with a "Kasasa" checking account. In particular, the dashboard 910 is shown as including user interface elements structured to allow the applicant to enter an initial deposit amount, to name the account, and also a number of additional options associated with this particular kind of checking account.

In this example, though other credit unions may have other checking account features, the Kasasa checking account includes options for allowing the applicant to engage in "Courtesy Pay Opt-In" (i.e. the credit union is able to front money, or give a quick loan to ensure a purchase may be completed even if there are insufficient funds in the current account), "Enroll in Rewards," "Order Checks," and "Sign Up For eStatements." Each of these selectable options, which are selectable using the check boxes displayed proximately to each option, is an option that this specific credit union offers in connection with its Kasasa checking account. As indicated above, other credit unions may offer other services or features for their different types of products and services. Accordingly, each product (e.g., the checking account) may have different service types. Indeed, every aspect of the user interface 900 (e.g., the initial deposit amount, the number and types of services provided for each product, the number and types of products, etc.) are fully configurable based on each respective credit union's requirements.

Notably, the disclosed embodiments are able to provide a listing of services and features on an initial configuration or product selection page (e.g., user interface 900) to enable applicants to easily select which products, features, and services those applicants are desirous to obtain, even during the application process. Traditional techniques, on the other hand, fail to provide this ease of use and quick configuration. Instead, traditional techniques often require applicants to fill out additional forms or even to visit a brick and mortar institution. Sometimes traditional applicants were required to obtain membership before they could even determine which products or services they wanted. By providing the disclosed beneficial options and services during the application phase using the user interface 900, applicants can easily opt in, enroll, or refrain from enrolling for receiving those services and products all while going through a single membership application process.

One will appreciate how each applicant's or each member's account information will maintain the different options, products, and services that an applicant or member has. For instance, suppose the applicant were to select the "Courtesy Pay Opt-In" option but did not select the "Order Checks" option. In the client database manager's database (e.g., database 255 of FIG. 2), the database record for that particular applicant will be modified or configured to include a true flag or other indication for the "Courtesy Pay Opt-In" option but a false flag or other indication for the "Order Checks" option. In this regard, the database may maintain the different products and services that are selected by the applicant. A query of the database may provide an indication regarding the applicant's selected options. Another potential service that may be included in some of the different account types is an overdraft protection option. Overdraft protection is distinct from the Courtesy Pay Opt-in option in that overdraft protection pulls money from one of the member's different accounts whereas the Courtesy Pay Opt-in option effectively operates as a short-term loan or a backup fund transfer provided by the credit union along with a determined fee for taking out the short-term loan.

FIG. 9 also shows a remove option 915 included within the dashboard 910. Although there is currently only shown one remove option 915, the dashboard 905 may also be provided with its own remove option. Upon selection of the remove option 915, the product associated with that remove option 915 (in this case, the Kasasa checking account) will be removed from the applicant's list of selected products. As an analogy, the user interface 900 is effectively operating as a so-called "shopping cart," where the applicant is able to pick among different products and select whichever product he/she is desirous to utilize from the credit union. If the applicant initially adds a product to his/her shopping cart but would then like to remove that product, the applicant need only select the remove option for that product to be removed from the applicant's list of selected products. Selection of the remove option also removes the corresponding dashboard from the user interface 900.

Figure 10:
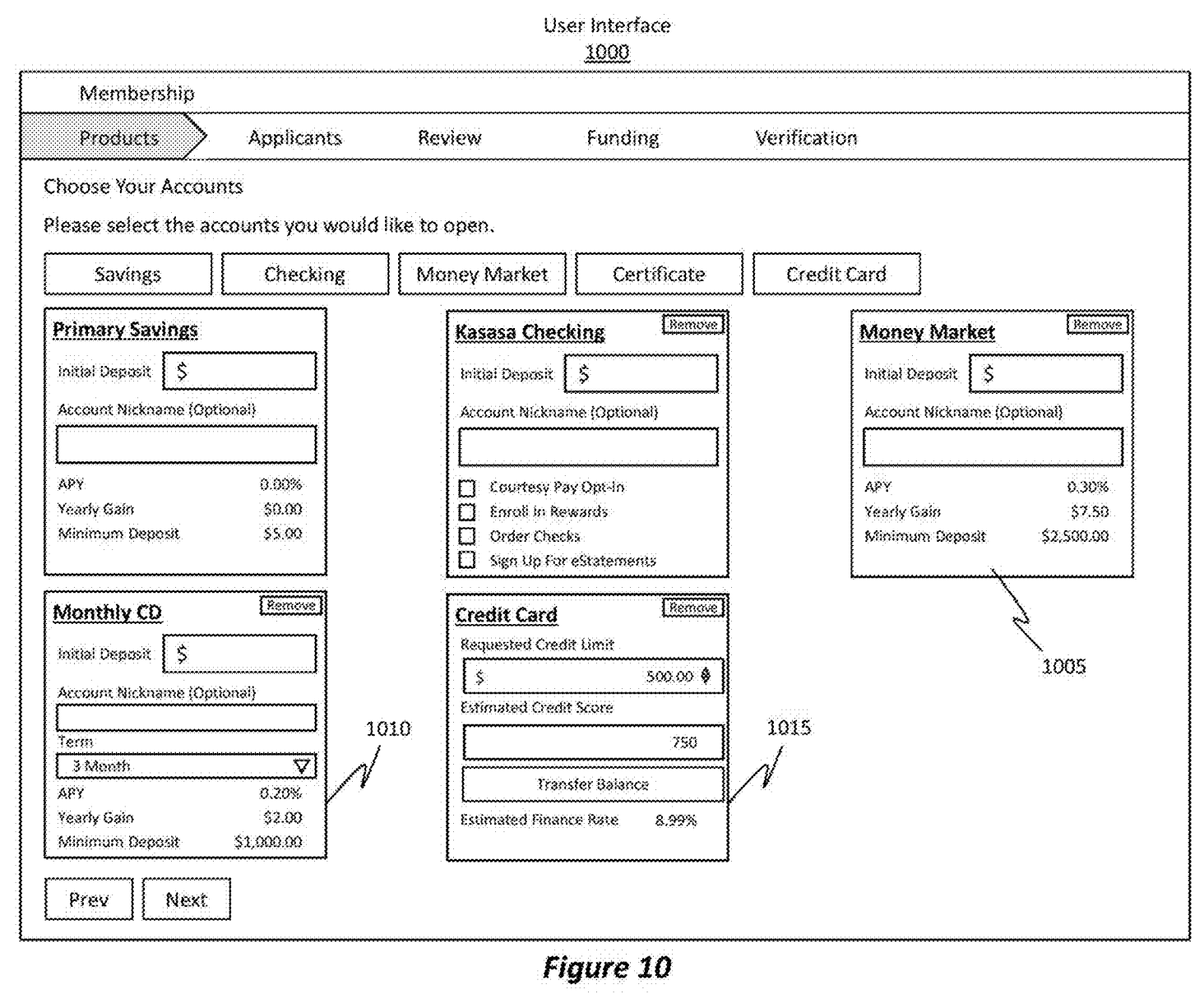

FIG. 10 provides another useful example of a user interface 1000, which is representative of the user interface 900 from FIG. 9 but which now includes additional products in the applicant's selection bin, shopping cart, or list of selected products. Notably, in addition to the two previous products and corresponding dashboards, user interface 1000 now includes a dashboard 1005 for a money market account, a dashboard 1010 for a monthly certificate of deposit (CD), and a dashboard 1015 for a credit card. Each dashboard 1005, 1010, and 1015 is configured to display a list of selectable or editable features that are associated with each type of product. As discussed earlier, each credit union may structure its different types of products in a different manner, so the user interface 1000 is fully configurable to support different products, services, and other features. Also note, each dashboard 1005, 1010, and 1015 includes a corresponding remove option to remove the product and dashboard from being linked or otherwise associated with the applicant. Additionally, depending on the number of products selected, the user interface 1000 will provide a scroll feature to enable the user interface 1000 to scroll in either a horizontal or vertical manner to enable the applicant to view which products have been selected.

In some embodiments, the user interface 1000 may include a number indication providing a quick summary of the number of products that are currently selected by the applicant. This number summary is particularly beneficial in situations where the total number of dashboards cannot all be viewed together and instead are accessed using scroll bars.

Once the applicant has selected his/her desired products, the workflow continues by the applicant selecting the "Next" button. The "Prev" button is provided to enable the applicant to return to a previous workflow process to edit that previous process, if so desired. In this manner, the applicant may be guided in a serial-like manner through the membership application process until the application is finalized. Accordingly, selection of the "Next" button triggers the next step in the workflow process, which next step is illustrated in FIG. 11.

The next step in the membership application workflow process is to collect personal information from the applicant. The user interface 1100 of FIG. 11 is provided to collect this personal information. To do so, the user interface 1100 includes any number of fields configured to collect the personal information and to provide structure to that information for retainment within the database mentioned earlier. Examples of these fields include, but are not limited to, a field for the applicant's first and last name, date of birth, gender, address, and phone numbers.

A beneficial feature offered by the client database manager is the option to automatically import this information from another source, such as information included in metadata associated with a web browser (e.g., autocomplete options) or even information scanned from an applicant's ID. The option 1105 provides the applicant with the ability to scan his/her ID and import that information directly into the corresponding fields. In the example shown in FIG. 11, the option 1105 is associated with the following text: "Take a picture of your driver's license or state issued ID to pre-fill your application." Selection of either this text or the upload icon next to the text will trigger the upload and/or scanning process.

In some cases, the embodiments enable the applicant to select an existing photo or file stored on his/her device to upload and to scan. In other cases, the embodiments enable the applicant to use the current device to capture a photograph of his/her ID, scan the ID, and then auto-populate the different fields.

Figure 12:
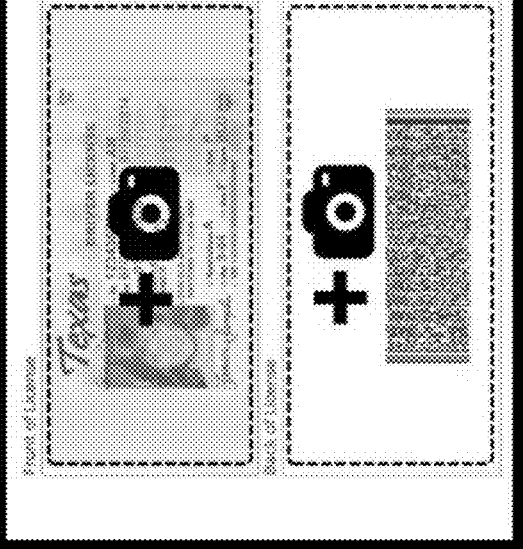
FIG. 12 illustrates an example pop-up window configured to enable an applicant to upload or capture a photograph of a government ID or other type of ID (e.g., a student ID).

FIG. 12 is an example of a scenario in which the applicant is being prompted to capture of photo of his/her driver's license. In particular, the user interface 1200 of FIG. 12 shows a pop-up window 1205 informing the applicant to take a picture of both the front and back of his/her driver's license. Selection of the top plus sign with the camera in the pop-up window 1205 will trigger initialization of the device's camera and the applicant will be able to capture the front side of his/her ID. Selection of the bottom plus sign with the camera in the pop-up window 1205 will also trigger initialization of the device's camera and the applicant will be able to capture the back side of his/her ID. In this regard, the system or device displaying the user interface may include a camera, and the image may be generated by the camera capturing a photograph of the applicant's ID. Of course, if the applicant does not like how the picture looks, the applicant can reselect the options in order to retake a photo until a suitable photo is obtained. Once a photo is obtained, the pop-up window 1205 will display that photo in the corresponding region (e.g., either the top or bottom part of the pop-up window).

By way of additional clarification, the embodiments are able to determine whether or not the applicant's current device includes picture-taking capabilities. If the device does include picture-taking capabilities, then selection of the option 1105 from FIG. 11 may automatically trigger usage of the device's camera. On the other hand, if the device does not include picture-taking capabilities, then selection of the option 1105 may automatically trigger the display of the current device's file system to enable the applicant to select a previously stored photograph for upload.

In any event, once a photograph of the applicant's ID is accessed, the embodiments are able to identify the patterns of the ID and extract relevant pieces of information from the ID. In some cases, the embodiments are able to initially scan the ID to determine what type of ID it is, such as a driver's license, passport, student ID, and so forth.

Any type of scanning process may be used. In some cases, machine learning may also be used to perform this scanning and recognition process. For instance, a machine learning algorithm may be trained on various different types of identifications. The machine learning algorithm may then be used to identify other types of identifications and to analyze those other identifications.

As used herein, reference to any type of machine learning may include any type of machine learning algorithm or device, convolutional neural network(s), multilayer neural network(s), recursive neural network(s), deep neural network(s), decision tree model(s) (e.g., decision trees, random forests, and gradient boosted trees) linear regression model (s), logistic regression model(s), support vector machine(s) ("SVM"), artificial intelligence device(s), or any other type of intelligent computing system. Any amount of training data may be used (and perhaps later refined) to train the machine learning algorithm to dynamically perform the disclosed operations. Accordingly, the embodiments are able to scan the photograph of the ID to extract the applicant's personal information from the ID.

In some cases, the quality of the picture may be analyzed to determine whether the quality satisfies a quality threshold or quality requirement. The quality threshold may be a minimum quality required in order to enable the client database manager to successfully read the photographic image and to extract the applicant's personal information therefrom. If the quality of the photograph is too low, then the manager may not be able to conduct a successful extraction. As such, an initial photograph quality determination may be performed to gauge the quality of the photograph to determine whether that quality satisfies the quality threshold. If the photograph's quality does not satisfy the threshold, then the applicant may be prompted to take another photograph of the ID. On the other hand, if the photograph's quality does satisfy the threshold, then the manager may proceed with its extraction process to obtain the applicant's personal information. As a consequence of this automatic process, the disclosed embodiments are able to significantly speed up the application process because the applicant will not need to manually enter the information. Of course, in the event the applicant does want to manually enter the information, he/she can do so by entering text in each of the respective fields. Furthermore, the applicant can modify any of the text that was previously auto-populated in a field.

Once the scanning and extraction have occurred, the client database manager is able to use the extracted information to then automatically populate one or more of the fields in the user interface, as shown in FIG. 13. Specifically, FIG. 13 shows an example user interface 1300, which is representative of the user interface 1200 from FIG. 12 but which has been auto-populated to include at least some of the applicant's personal information, which was extracted from the applicant's ID.

For instance, the applicant's first name (e.g., Darian) has been automatically entered into the first name field 1305. Other extracted pieces of personal information have also been automatically entered into other fields, such as the applicant's last name, date of birth, gender, and address information.

The user interface 1300 has also been modified to include a few additional notifications reflecting the success or failure of the scan, extract, and auto-populate workflow operations. For instance, the field 1310, which included the selectable option to scan the applicant's ID, has now been updated with two additional pieces of information, namely an indication 1315 reflecting the success or failure of the scan and analysis performed on the front of the ID as well as an indication 1320 reflecting the success or failure of the scan and analysis performed on the back of the ID. Here, the indication 1315 reads as follows: "Front of license has been successfully captured." Similarly, indication 1320 reads as follows: "Back of license has been successfully decoded." Often, the back of a driver's license includes a barcode, so the embodiments are able to decode the information included in the barcode and use any personal information in that barcode to potentially autofill or auto-populate the different fields in the user interface 1300. By providing the indications 1315 and 1320, the applicant may be made immediately aware as to the success or failure of the scanning process. Furthermore, in addition to text, the indications 1315 and 1320 may also include a success icon (e.g., perhaps a "check") or a failure icon (e.g., perhaps an "x"). The combination of text with an icon provides additional information indicating the status of this workflow step.

In some embodiments, the client database manager obtains a template for each state's different type of ID (e.g., state IDs or state driver's licenses) and/or the government's different types of IDs (e.g., passports). Using these templates, the manager is able to compare and contrast a photograph of the ID to determine the format or pattern of the personal information included in the ID and then extract the information therefrom. Additionally, or alternatively, the embodiments may utilize the machine learning algorithm mentioned earlier.

Figure 14:
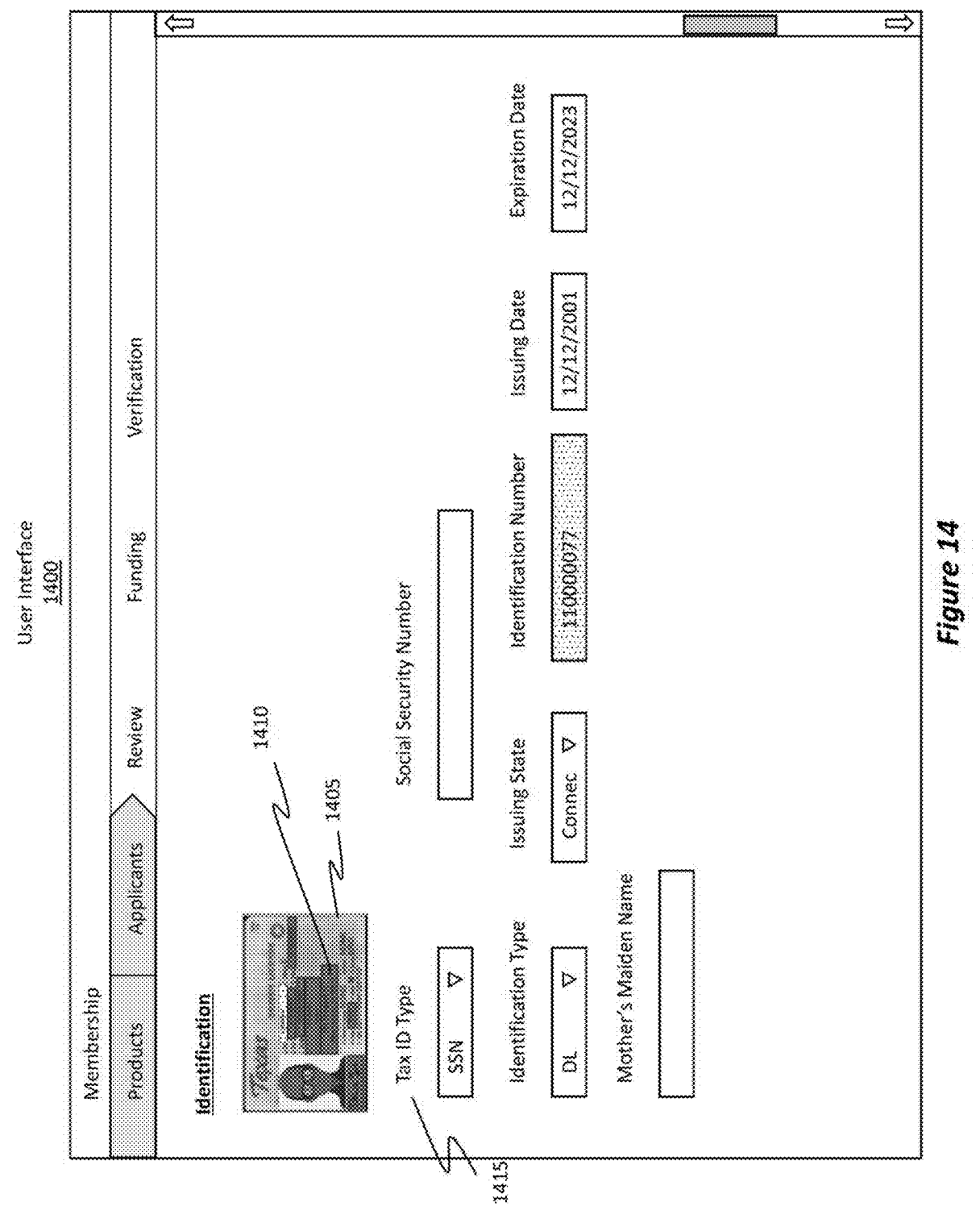

FIG. 14 shows an example user interface 1400, which is a continuation or a scrolled down view of the user interface 1300 from FIG. 13. User interface 1400 is shown as now visually displaying at least the front side of the applicant's ID (e.g., in this case the driver's license 1405). To clarify, after the applicant has obtained a copy of his/her ID, a visual representation of that ID is then displayed in the user interface 1400, as shown by the license 1405.

Additionally, in accordance with the disclosed embodiments, the ID is displayed in a manner so as to emphasize or call attention to the sections of the ID that were used to auto-populate the UI fields. By way of example, user interface 1400 shows how certain sections 1410 of the license 1405 have been visually highlighted or emphasized. In particular, the sections 1410 correspond to the applicant's name, address, date of birth, and so forth. To reiterate, after the photograph of the applicant's ID is obtained, the embodiments display that photograph in the user interface 1400. Additionally, sections of the ID that were used to populate the UI's fields are then visually emphasized to call attention to those relevant section. As a consequence, the ID, the emphasized sections, and at least some (though potentially all) of the auto-populated fields are all displayed simultaneously with one another in the user interface (e.g., if the user interface 1400 were to be scrolled upward, portions of the user interface 1300 from FIG. 13 would be visible simultaneously with the license 1405 as well as other portions in user interface 1400).

In some cases, the same emphasis provided to a particular section of the image of the ID may also be applied to the corresponding user interface field. By way of example, user interface 1400 shows the "identification number" UI field as have a dotted background. This dotted background is also being applied to the identification number included in the driver's license 1405. As such, the same formatting or emphasis applied to a particular section of the image may also be used to emphasize that section's corresponding UI field in the user interface. In this regard, each section can be quickly matched against its corresponding UI element in the user interface. Such a feature is particularly beneficial because it helps improve the efficiency by which auto-populated fields are identified and then compared against that field's corresponding section in the ID image.

As shown in FIG. 14, the user interface 1400 has also been auto-populated to include the applicant's driver's license information (e.g., the driver's license number, issuing date, and expiration date), all of which may have been extracted from the license photograph. Additionally, user interface 1400 is shown as including a section for entering a so-called tax ID type 1415. Here, a number of selectable options are available for the tax ID type 1415, including, but not limited to, the applicant's social security number or even an ITIN (individual taxpayer identification number). In some embodiments, a foreign identification number or even a passport number may be used as well.

Proximate to the tax ID type 1415 selection box is displayed a field for entering the requested information. This information is used to perform an authentication or a background check on the applicant. Additionally, in some cases, the applicant's phone number and/or email address are also used to perform authentication to verify the identity of the applicant.

In some cases, a multi-factor authentication process is used. By way of example, once the application fields are fully filled in, then the client database manager is able to trigger a multi-factor authentication process to verify at least the email address and/or the phone number provided in the user interface. In some cases, the triggering is performed a threshold time period after the email, phone number, and social security or ITIN fields are completed such that the embodiments need not wait until the application is complete.

To perform the multi-factor authentication, an SMS text may be sent to the phone number provided by the applicant, where the SMS message may include an access code (e.g., perhaps a 6 digit code, or any other number of digits or even an QR code) for the applicant to then enter into the user interface (e.g., as shown later in FIG. 18) via manual entry or via photo capture. Additionally, or alternatively, the manager may send a message to the listed email address for verification purposes. Such a process in the workflow constitutes a post-validation operation in order to ensure that the applicant is entering accurate and true information.

Another authentication workflow step that may be performed is to perform an independent analysis of either the phone number or the email address provided. For instance, the embodiments are able to analyze the phone number to determine whether a correct number of digits have been entered for the phone number as well as a valid area code. Similar analysis may be performed on the email address to verify whether the email address is associated with an actual domain name. Yet another authentication workflow step may be a requirement for the applicant to enter his/her mother's maiden name, as shown in the user interface 1400. A background check may be performed using this information as well in order to verify the information the applicant is providing.

FIG. 14 shows the user interface 1400 displaying the identification type as being a "DL," or a driver's license. The embodiments are able to automatically analyze the applicant's photograph to determine the type of ID he/she is using. Based on this analysis, the embodiments can then automatically switch or select the corresponding value from the drop-down selection box next to the identification type in user interface 1400. Of course, other types of ID may be used and automatically recognized as well. Examples of these other types of IDs include, but are not limited to, a state ID card, a US passport, a foreign passport, a military identification card, or even a resident alien card. Similar to how the embodiments scanned and extracted information from the applicant's driver's license, the embodiments are also able to scan and analyze these other types of IDs. Additionally, a visual representation of those IDs may be displayed in the user interface 1400 as well.

The workflow process is also able to dynamically check the format of the entered information while it is being entered. By way of example, suppose the driver's license identification number was auto-populated into the user interface 1400, but then the applicant deletes one of the numbers. The embodiments are able to determine which state driver's license is being used, determine the number of digits used in that state's driver's license number, and then determine whether the current entry in the user interface 1400 has the correct number of digits. In this case, because the applicant deleted one of the digits, the format of the number is no longer correct. The embodiments are able to trigger an alert to inform the applicant of the incorrect format and request the applicant to provide the correct number. In some cases, a recommendation may even be provided to refer the applicant back to the displayed license 1405, and the recommendation may even alter the specific highlighted section of the license 1405 to more fully emphasize the driver's license number. To clarify, if an auto-populated field is subsequently modified by the applicant, the embodiments are able to flash, highlight, change color (to be different from other colors used to emphasize the other sections of the license 1405), or provide additional emphasis on the displayed ID (e.g., the license 1405 in FIG. 14) for the specific section corresponding to the modified field. This additional emphasis will direct the applicant's attention to not only the displayed license 1405 but also to the specific section of the license 1405 corresponding to the modified field.

It should also be noted that the image of the applicant's ID may be pushed or retained within the database mentioned herein. As such, the credit union will be able to have a copy of the applicant's ID as well as potentially a picture of the applicant. This picture may be used for later authentication purposes in the event the applicant needs picture-based identification proof.

Figure 15:
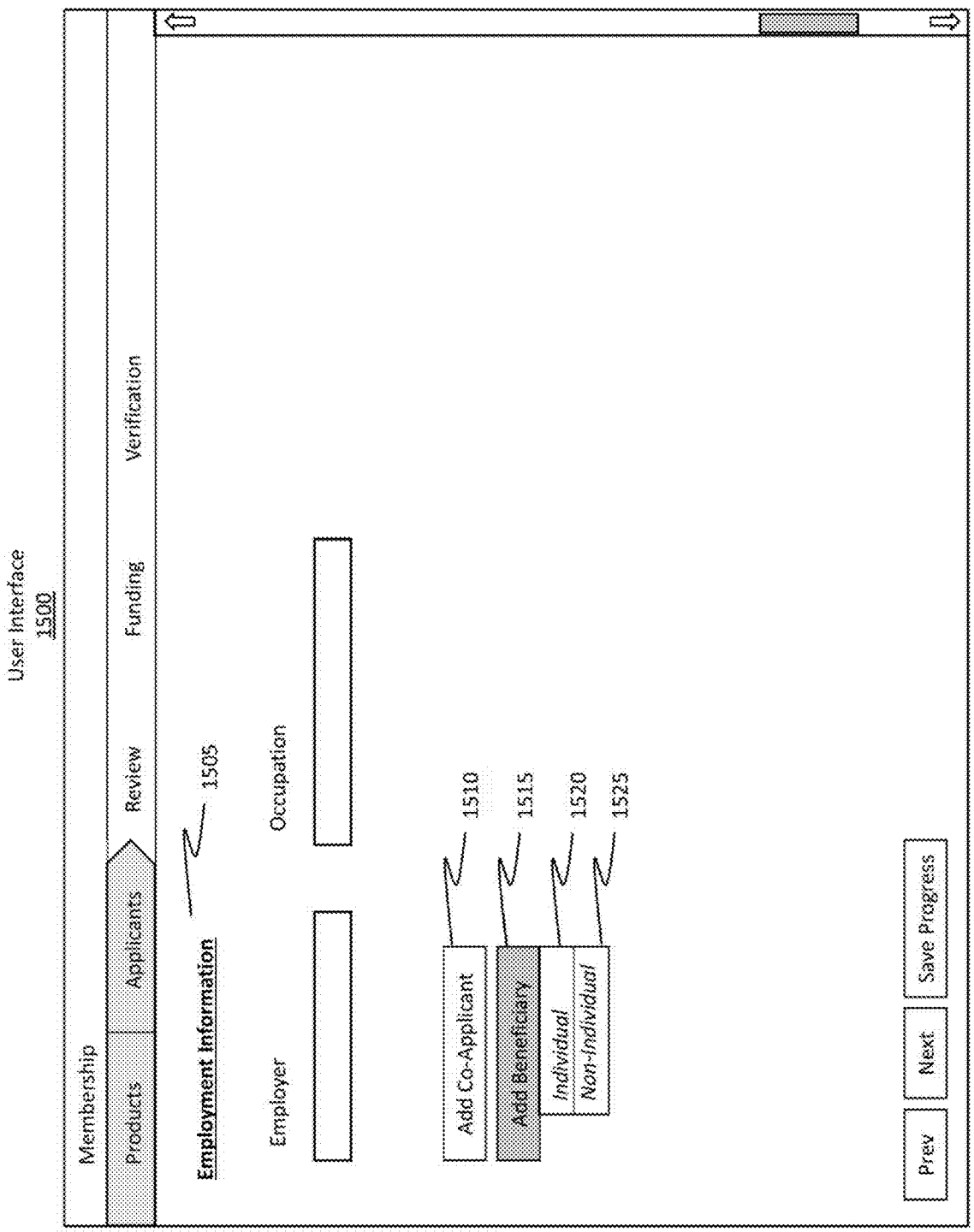
FIG. 15 illustrates how a co-applicant and/or a beneficiary may be linked to the applicant's share or account.
Figure 17:
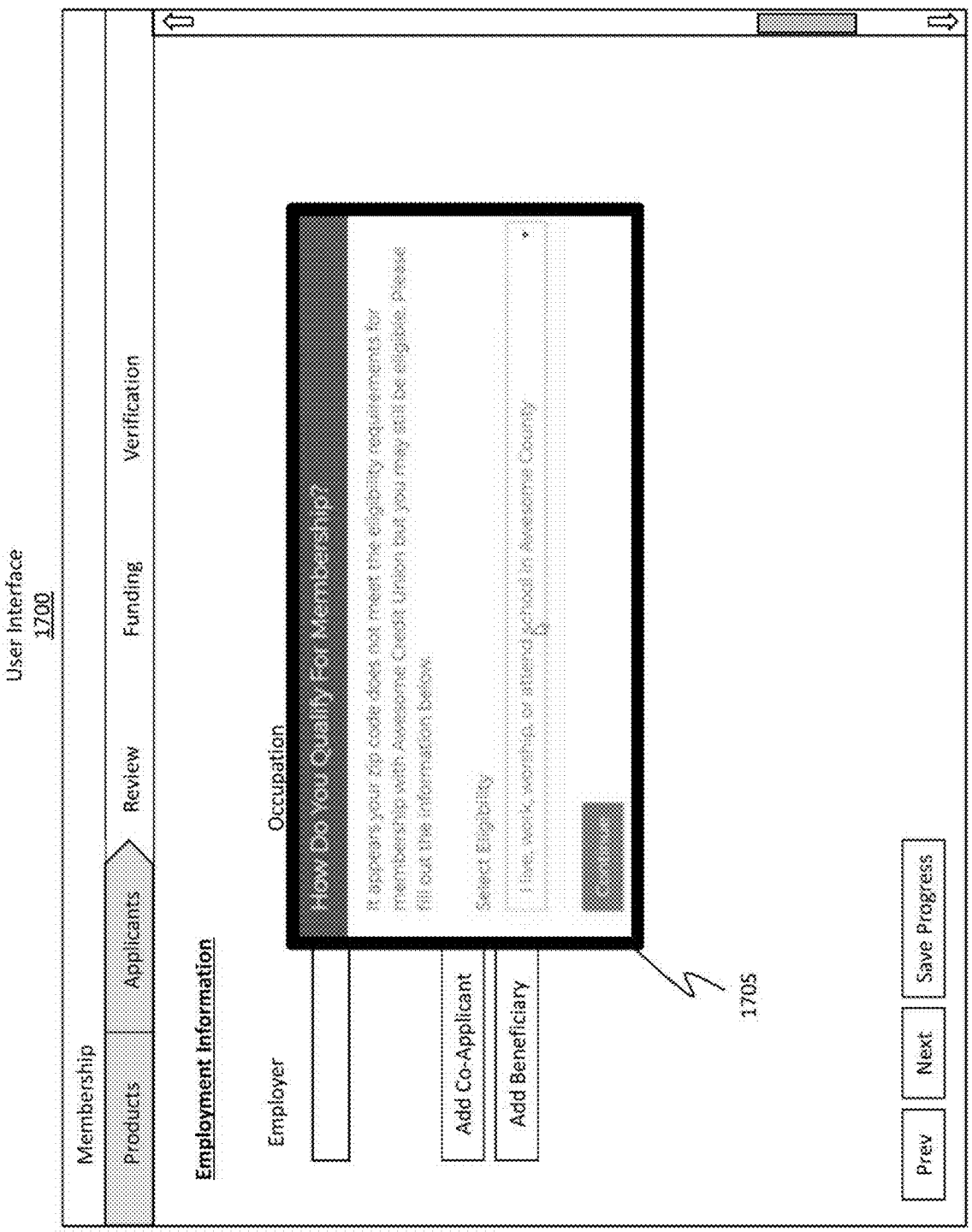
FIG. 17 illustrates an example pop-up window that may be used to verify the applicant qualifies for membership with the credit union.

FIG. 15 is a continuation of user interface 1400 from FIG. 14 and user interface 1300 from FIG. 13 in that user interface 1500 of FIG. 15 is a scrolled down view of these user interfaces. Here, the applicant is able to enter employment information 1505 describing his/her place and type of employment.

Additionally, user interface 1500 is shown as including the option 1510 to add a co-applicant to form a joint account between the primary account holder (i.e. the applicant) as well as the added co-applicant. Selection of the option 1510 to add the co-applicant will trigger the display of additional fields to enable the applicant to enter the personal information of the co-applicant, where the required personal information is substantially similar to the required fields the applicant used to enter his/her own personal information.

User interface 1500 also shows an option 1515 to add a beneficiary, who will be able to receive the funds upon the death of the applicant and co-applicant. Selection of the option 1515 produces a drop-down field displaying an individual option 1520 and a non-individual option 1525 to act as the beneficiary. FIG. 16 provides additional information relating to the individual option 1520.

In particular, selection of the individual option 1520 from FIG. 15 causes the user interface 1600 to be displayed and in particular causes the beneficiary information 1605 to be displayed. Here, the applicant is able to enter the personal information of the beneficiary in the beneficiary information 1605. Any number of beneficiaries may be added, and the percentage each beneficiary is to received may be set. If the non-individual option 1525 were selected, UI fields will be displayed to enter information pertinent to identifying the non-individual (e.g., the name of a business, the address of the business, the information describing a trust, etc.).

Through the application process, the applicant will be presented with the option to select the "Save Progress" button, which will trigger the entered information to be saved in the database and which will trigger the application to be placed in a queue for holding incomplete applications. Using this option enables the applicant to save the state of the application so the applicant can return to finish it at a later point in time.

Selection of the "Save Progress" button, in some embodiments, will trigger an email to be sent to the email address that was provided earlier. This email will include a selectable link that, when selected, returns the applicant to the application at the location where he/she left off earlier. Additionally, or alternatively, a text message will be sent to the applicant's mobile phone with a verification code. When the user returns to the web browser used to initially display the application process, the user can enter the verification code into a specific field as well as potentially other verifying information (e.g., perhaps his/her mother's maiden name), and the client database manager will return the applicant to his/her application.

After completing the personal information workflow process, the next step in the workflow is to provide proof or verify that the applicant qualifies for membership under the bylaws or charter of the credit union. Depending on the bylaws or charter of the credit union, the information the applicant already entered may provide adequate proof for qualification. By way of example, suppose the qualifications require the applicant to live in a certain area or to work for a certain employer. An analysis of the applicant's personal information will enable the system to make a determination as to qualification. If the analysis produces a result indicating the applicant does qualify, then the proof of qualification workflow step is complete in a seamless manner and the applicant may be informed via a pop-up window indicating the applicant qualified based on the information he/she already entered.

If, on the other hand, the information already provided by the applicant is not sufficient to prove qualification or if the information seemingly contradicts the qualification requirements (e.g., the entered address is outside of the geographic region required for membership), then the embodiments are able to trigger an additional request for information. In the example provided in FIG. 17, the bylaws of this particular credit union require applicants to live within a certain zip code, but the applicant's zip code was different from the allowed zip code. As a consequence, the pop-up window 1705 is displayed to provide additional proof of qualification.

Accordingly, this next workflow step provides the applicant with an opportunity to enter proof for membership qualification. This opportunity is visualized using the user interface 1700 of FIG. 17 and the specific workflow step is triggered in response to the applicant selecting the "Next" button in FIG. 16 and in response to an analysis that the zip code was not listed in a list of qualified zip codes.

Initially, a pop-up windows 1705 will be displayed to provide the applicant the opportunity to prove he/she qualifies for membership. As shown, this pop-up window 1705 includes the following text: "It appears your zip code does not meet the eligibility requirements for membership with Awesome Credit Union but you may still be eligible." "Please fill out the information below." This text is for example purposes only and should not be considered as binding. Indeed, any other text to provide the applicant with an opportunity to prove qualification may be used, based on the credit union's bylaws.

The applicant is then provided with a list of selectable options. One option is that the applicant lives, works, or attends school in the qualified geographic region. Another selection option is to indicate that the applicant has a family member who is already a member of the credit union. Indeed, any additional proof may be provided to verify that the applicant is indeed qualified to be a member with the credit union under the credit union's bylaws or charter.

Whereas traditional techniques for applying for membership with a credit union were slow and painstakingly laborious, one will appreciate how the disclosed embodiments, intelligence, and workflow processes streamline the application process to enable almost-instantaneous determinations as to membership eligibility and qualification. As such, the disclosed embodiments provide substantial benefits to users and even to credit unions in that they provide easy and streamlined workflow processes for conducting a membership application and for determining membership eligibility. In less than five minutes, the embodiments are able to answer the question as to whether an applicant qualifies for membership with a credit union. Such speed has been previously unachievable due to the laborious processes used by traditional systems.

Figure 18:
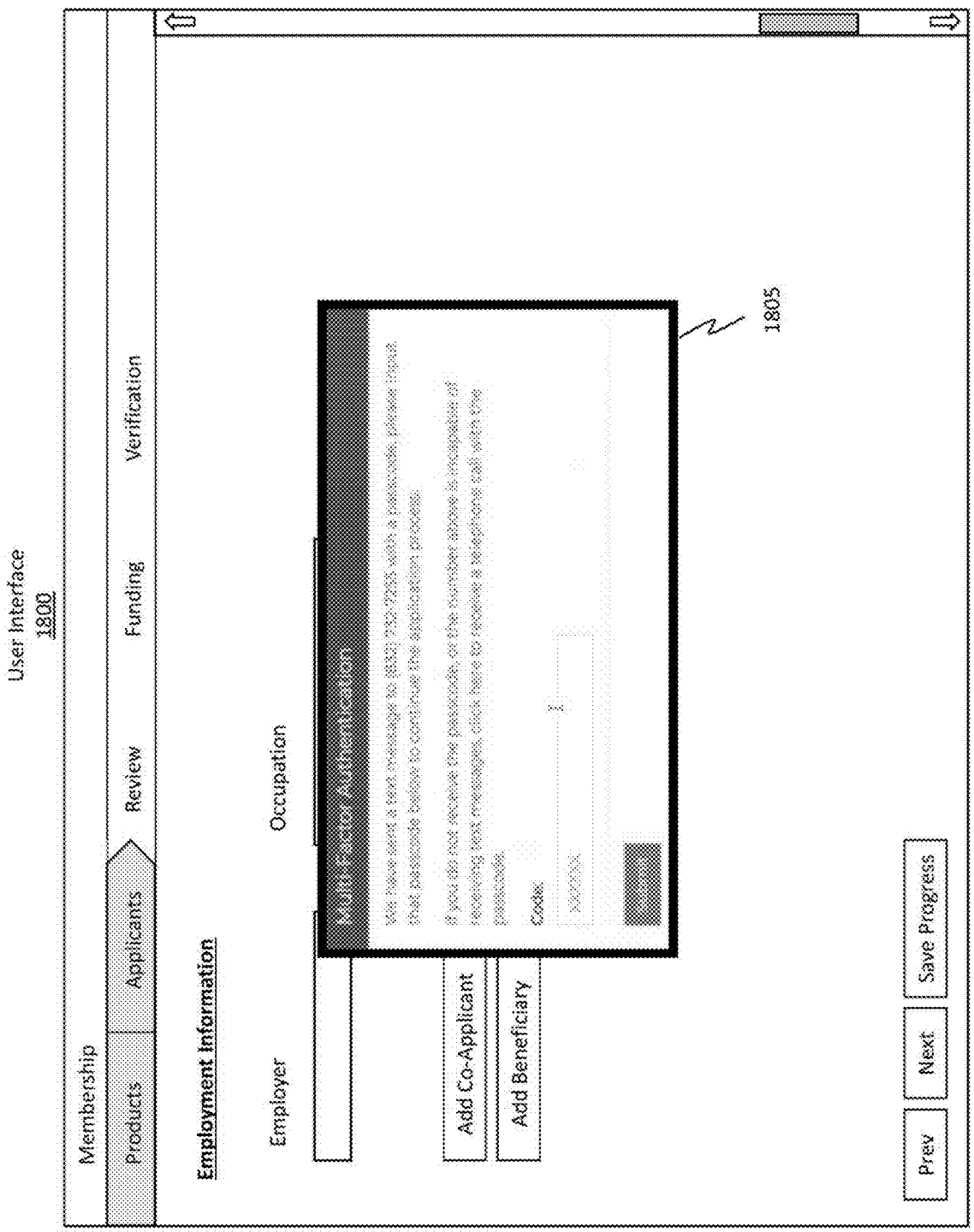
FIG. 18 illustrates an example user interface for conducting multi-factor authentication.

As described earlier, the embodiments are able to perform multi-factor authentication workflow process steps. FIG. 18 illustrates an example user interface 1800 for performing the multi-factor authentication using the pop-up window 1805. Pop-up window 1805 is provided to enable the applicant to enter the verification code he/she received either via text, email, or some other transmission technique.

Figure 19:
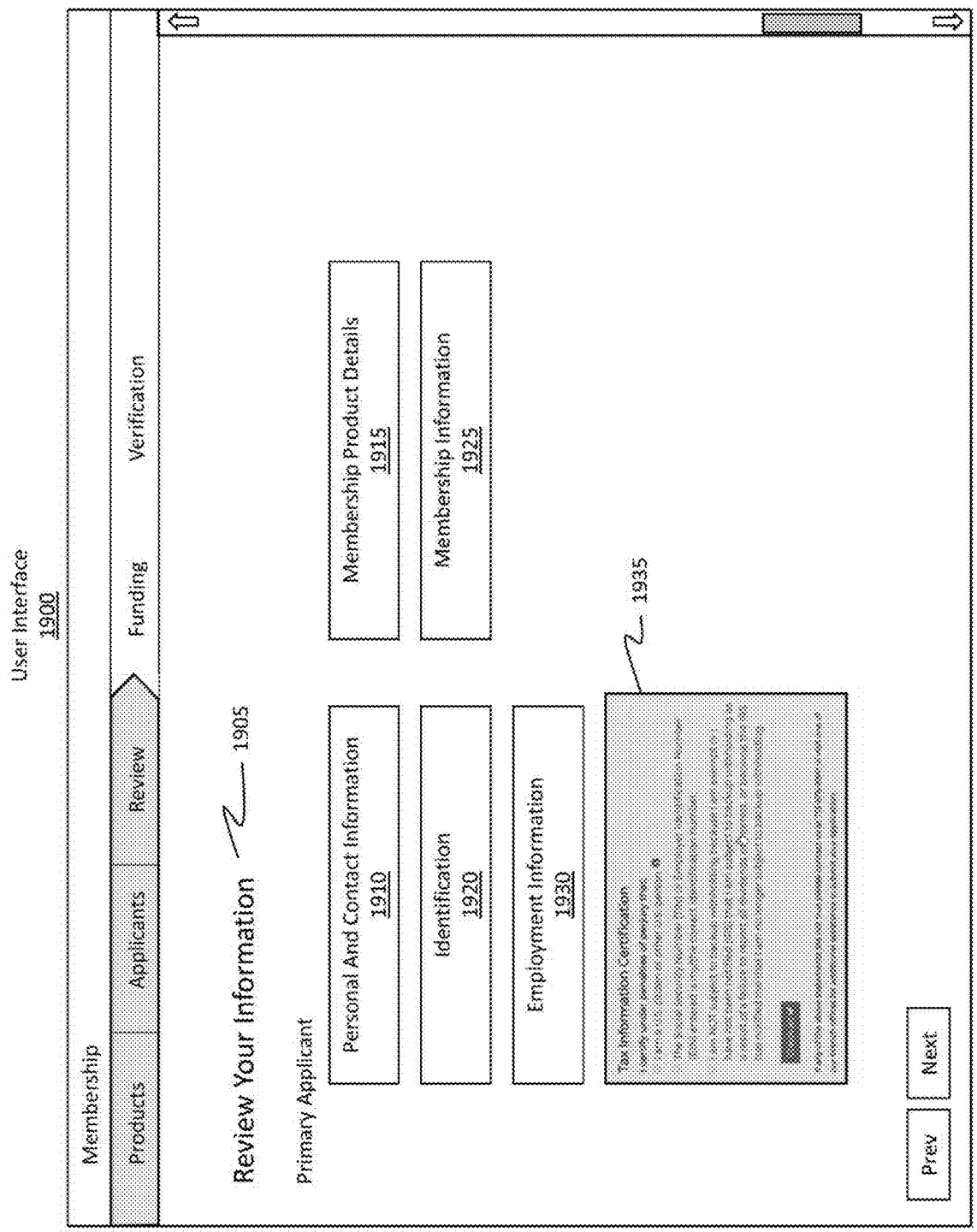
FIG. 19 illustrates a summary view of the applicant's information.
Figure 20:
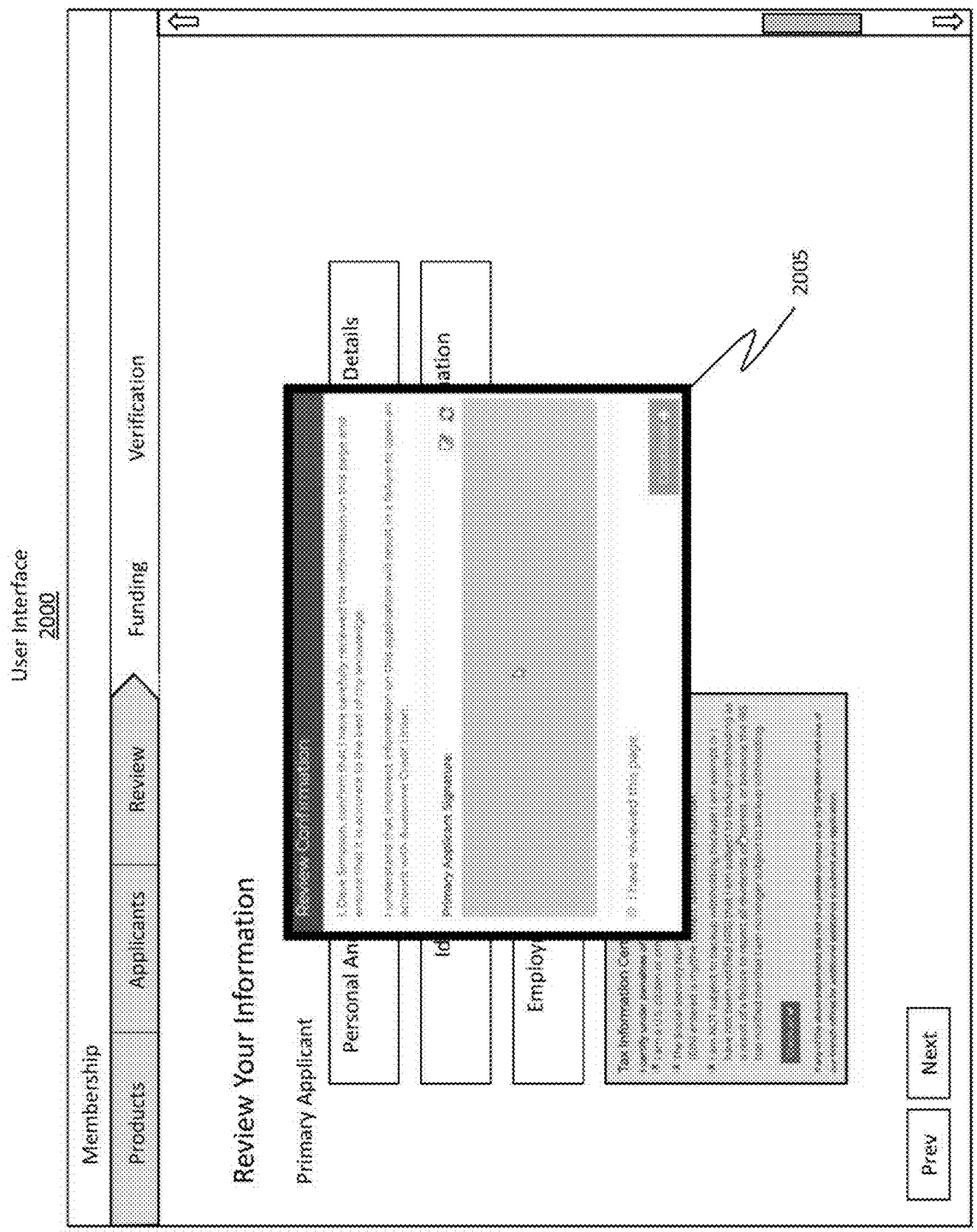
FIG. 20 illustrates another technique to enable the applicant to certify his/her information is true and accurate.

Subsequent to the multi-factor authentication workflow step, the next workflow step is to provide a summary view of the applicant's application information, as shown by user interface 1900 of FIG. 19. In particular, the user interface 1900 provides an option 1905 to review the applicant's entered information and, if necessary, to even make modifications to that information.

Here, user interface 1900 is shown as providing a summary or condensed view of the applicant's personal and contact information 1910, the membership product details 1915 (e.g., did the applicant select a savings account product, a checking account product, and so forth), the applicant's identification 1920 information (e.g., the driver's license), the applicant's membership information 1925 (e.g., the manner by which the applicant was determined to be eligible for membership), and the applicant's employment information 1930. In some cases, a selectable link may be provided with the identification 1920 information to enable the applicant to view the photo of his/her ID. If a co-applicant or a beneficiary were included in the application, then summary information about the co-applicant or beneficiary would be provided as well. In any event, this summary view or snapshot provides the applicant a way to quickly review his/her information for completeness and accuracy. The user interface 1900 may also display tax-based verification information 1935 to allow the applicant to certify the provided information is correct.

The next step in the workflow process is triggered in response to the applicant verifying the information provided in user interface 1900 and pressing the "Next" button. This next workflow step is another verification or declaration process and is visually shown by user interface 2000 of FIG. 20.

In particular, the applicant is presented with a pop-up window 2005 in which the applicant is required to sign or provide a signature certifying that the information he/she provided is true, complete, and accurate. If a touchscreen device is being used, then the applicant can touch the screen to enter his/her signature. Alternatively, a mouse or cursor may be used to enter the signature. The signature is then captured and may be included in the applicant's membership information, potentially even on the applicant's account card, and even pushed to the credit union's core system for reference later on.

Figure 21:
FIG. 21 illustrates a workflow process in which the applicant is able to submit information to fund his/her shares with the credit union.

The next step in the workflow process is displayed in user interface 2100 of FIG. 21. Here, the applicant is able to fund his/her account using the funding option 2105. Any funding technique may be used, including, but not limited to, paying with a credit or debit card, transferring money from another financial institution, or even transferring money from a different account in the current credit union. Each option will cause modifications to the user interface 2100 to provide fields for entering funding information. In the current example, the "Transfer from another financial institution account" has been selected along with the option to pay via a "Checking" account. Here, the applicant is presented with the option of entering his/her routing number and account number to electronically provide a check for funding purposes. If the credit or debit option were selected, then the user interface 2100 will dynamically change to include fields for entering credit or debit card information.

Additionally, the applicant may enter a promotion or "promo" code to reduce any initialization fees that a credit union may impose on new applications, to pre-fund one of the new accounts, or to provide any other type of discount. Also, some credit unions may allow the applicant to set up or enable overdraft protection (including the source of the overdraft, such as a primary savings account) during this workflow phase. The applicant can also select the option to receive a debit card and to link the debit card to a specific one of the applicant's new accounts. The same options are available for the co-applicant as well. In any event, the applicant can enter any amount of financial information so as to fund his/her credit union accounts.

Figure 22:
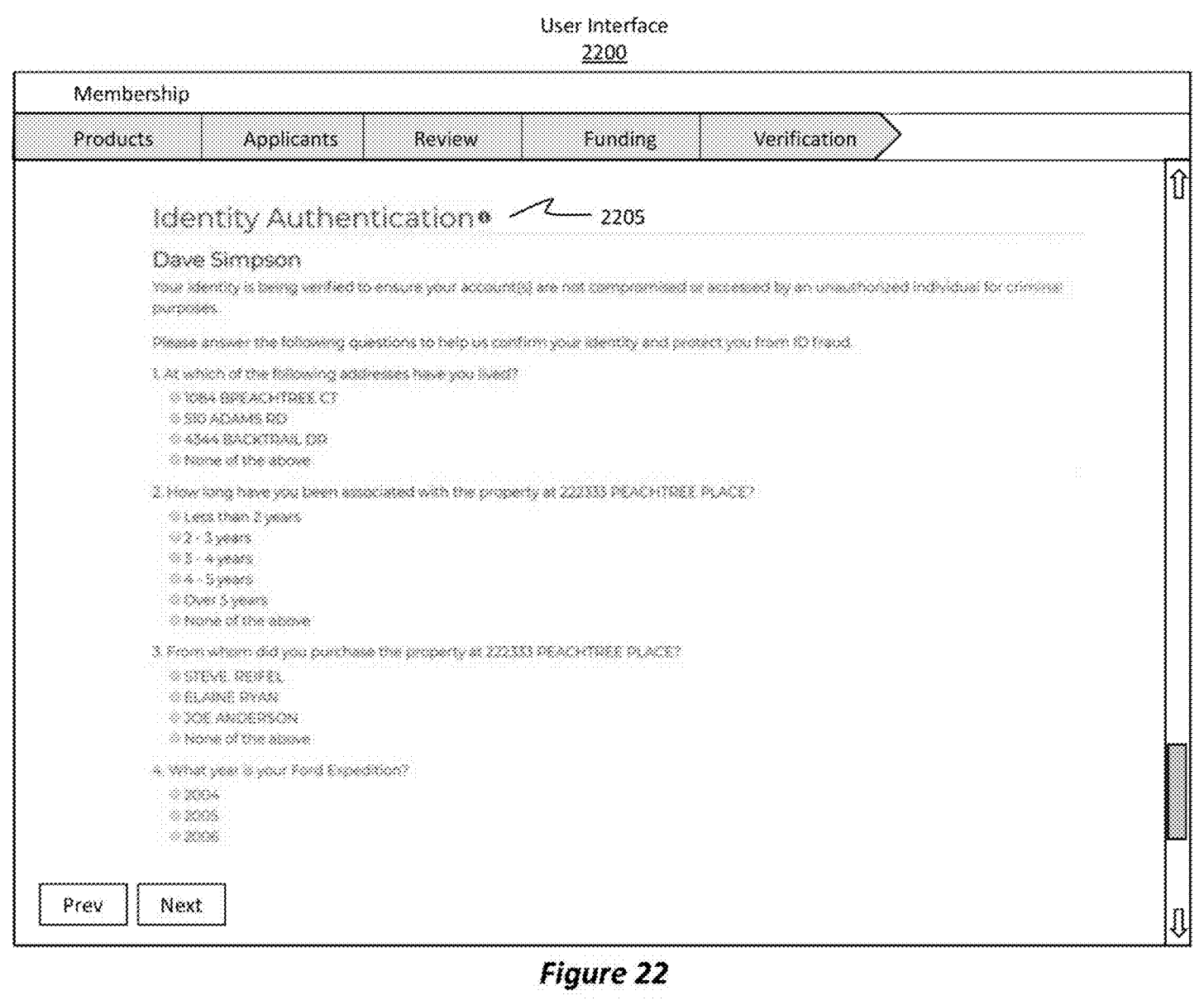

The next step in the workflow process is yet another authentication step, as shown by user interface 2200 of FIG. 22. In particular, the applicant's identity may be checked once again by submitting a list 2205 of questions that may or may not be related to characteristics associated with the applicant. For instance, the list 2205 of questions may be generated by performing a background check on the applicant based on the applicant's entered information. This list 2205 of questions may include questions about past or current places of employment, past or current places of residence, past or current vehicles, and so forth. Answers to these questions provide ID authentication so that the applicant has to prove (by entering correct answers to the questions) that the applicant is who he/she is claiming to be.

If the answers to the questions are determined to be correct, the workflow may proceed with additional authentication checks to perform tax history and banking assurance checks, identification checks, and credit checks. To perform these processes, requests may be submitted to any number of third-party background checking institutions as well as to any of the credit bureaus (e.g., to pull the applicant's credit). These verifications are performed to cross reference the applicant's information with verified background information to ensure the applicant is not fraudulently submitting an application.

If the applicant fails the verification checks, then the applicant may be requested to review the information once more to ensure its accuracy prior to the authentication checks being conducted once more. If the applicant fails yet again, then the applicant may be denied membership.

On the other hand, if the applicant passes the verification workflow steps, then the next step in the workflow is to grant membership to the applicant. Up to this point, the applicant has been presented with potential options for obtaining products or services from the credit union. Once membership is granted, however, then the selected products and services may actually be provided to the applicant. In particular, the application information is then pushed into the credit union's core database or core system. An API or library may be used for this pushing process to ensure that the information is formatted in accordance with credit union core's requirements and configurations. In response to pushing the application to the credit union's core, the credit union is then triggered to provide a membership ID as well as account numbers associated with the products the member requested.

Figure 23:
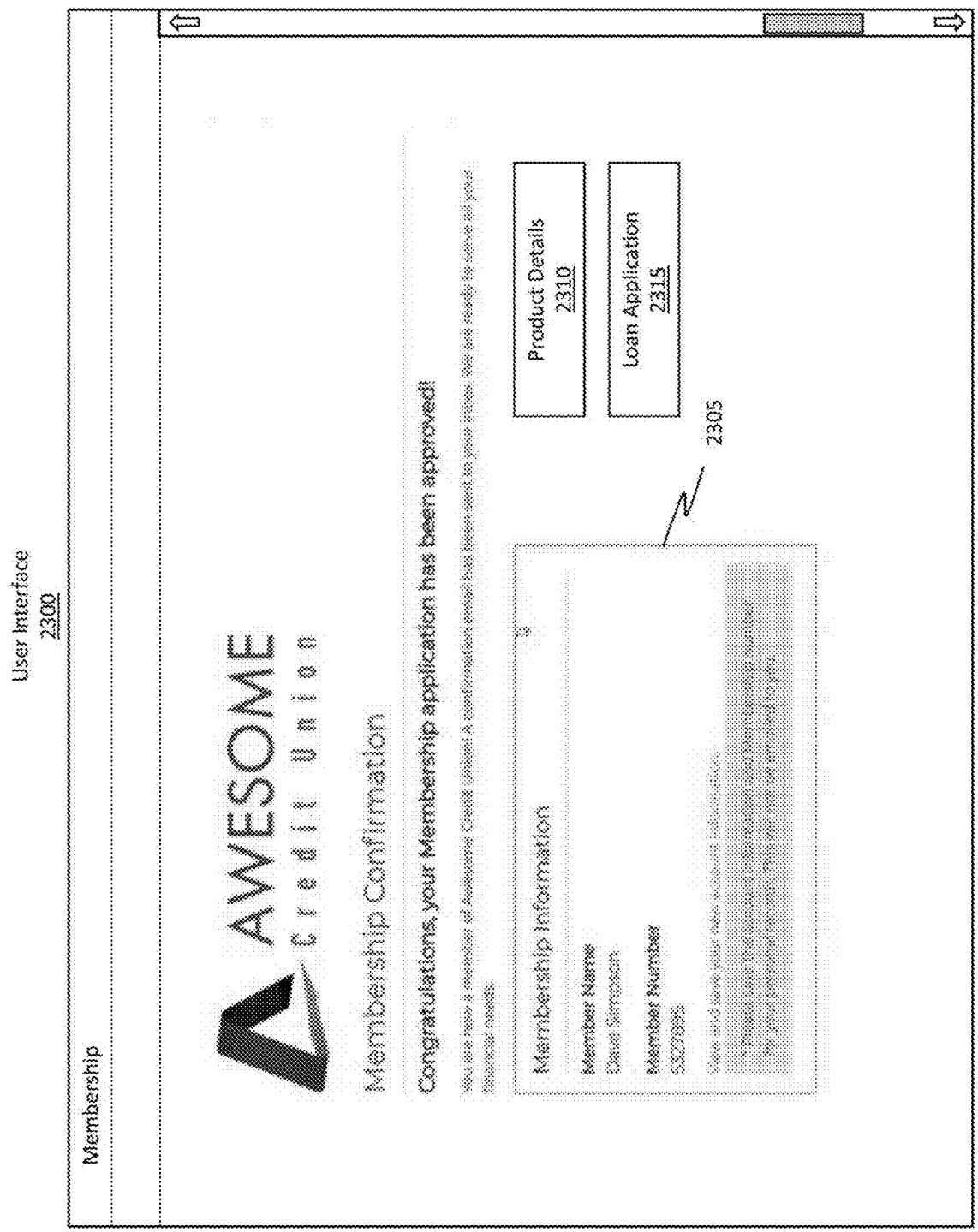
FIG. 23 illustrates a workflow step in which the applicant has been granted membership with the credit union.

Granting membership is visually illustrated by user interface 2300 of FIG. 23. In particular, the applicant, who is now a member and will be referred to as such, is now provided with membership information 2305, which may include a membership ID as well as any account numbers the member may now have with the credit union. The user interface 2300 may also display the member's product details 2310 (e.g., which accounts the member opened). Additionally, depending on the account type the member opened (e.g., Person, Teens, or Youth), additional offers or products may be submitted to the member for review. One example of an offer may be a loan application 2315. The member, based on his/her information, may be eligible to take out a loan with the credit union. Accordingly, any number or type of additional offers, products, or services may be offered to the member in the user interface 2300. Additionally, with membership, the member now has a share with the credit union.

Methods for Automatically Managing Membership Applications

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 24:
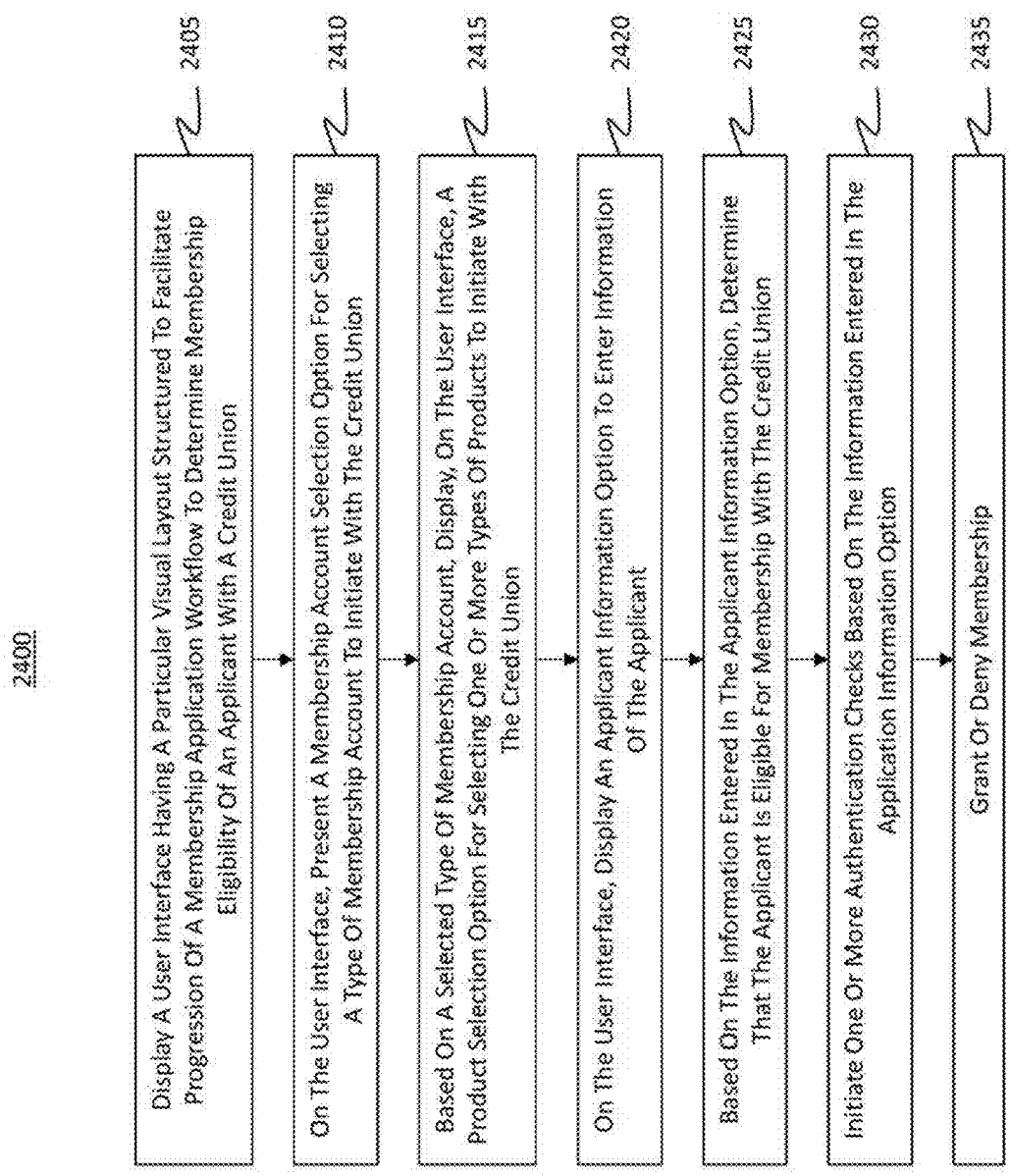
FIG. 24 illustrates a flowchart of an example method for performing the disclosed workflow processes.

Attention will now be directed to FIG. 24, which illustrates a flowchart of an example method 2400 for facilitating progression of a membership application workflow to determine membership eligibility with a credit union. Method 2400 relates to the workflow 400 of FIG. 4 as well as the workflow steps recited in FIGS. 5 through 23.

Initially, method 2400 includes an act (act 2405) of displaying a user interface (e.g., the user interfaces discussed in FIGS. 5 through 23) having a particular visual layout structured to facilitate progression of a membership application workflow to determine membership eligibility of an applicant with a credit union. On the user interface, there is then an act (act 2410) of presenting a membership account selection option for selecting a type of membership account to initiate with the credit union. For example, the user interface 600 from FIG. 6 may be displayed to enable the applicant to select from among different account types, such as Personal, Teens, or Youth.

Based on a selected type of membership account, there is an act (act 2415) of displaying (e.g., on the user interface 700 of FIG. 7) a product selection option (e.g., the savings account 705, a checking account 710, a money market account 715, a certificate of deposit 720, and a credit card 725 from FIG. 7) for selecting one or more types of products to initiate with the credit union.

Method 2400 continues by displaying (act 2420), on the user interface, an applicant information option to enter information of the applicant, such as that shown in FIGS. 11 through 16. In some implementations, at least some of the information entered into the applicant information option is auto-populated by extracting the information from an image of the applicant's ID.

Based on the information entered in the applicant information option, there is then an act (act 2425) of determining that the applicant is eligible for membership with the credit union, as shown in FIG. 23. Additionally, one or more authentication checks may be initiated (act 2430) based on the information entered in the application information option. These checks may include any type of check, including a background check performed on the information provided by the applicant as well as a credit run.

As described throughout this disclosure, the user interface has a particular visual layout that is structured to solve the efficiency problems prevalent with traditional application systems. This particular visual layout is required to include an image of an identification (ID) of the applicant (e.g., license 1405 in FIG. 14), where the image is displayed simultaneously with at least some of the information entered in the applicant information option, as shown in FIG. 14. Such a feature is beneficial for efficiency purposes because of the automatic extraction recited earlier as well as the ability to quickly review and compare the auto-populated information against the information actually included in the image of the applicant's ID.

Additionally, one or more sections (e.g., sections 1410) of the image, which is included as a part of the particular visual layout of the user interface, are displayed in an emphasized form to correspond to the at least some of the information displayed simultaneously with the image. By way of example sections 1410 from FIG. 14 are emphasized (e.g., highlighted) to correspond to the personal information entered in user interface 1400. Such emphasis further advances the efficiency objectives because the emphasized sections can be readily identified and then compared against the auto-populated fields to ensure accuracy and completeness.

In some implementations, the "emphasized" form includes highlighting, flashing color, or even added boxes visually displayed around the relevant sections of the displayed image. By way of a specific example, one section of the image may include a section listing a name of the applicant (or address, height, weight, etc.). Here, the name of the applicant on the image can be visually highlighted within the user interface, as shown in FIG. 14. Continuing with the example, another section of the image may include a listing of an address of the applicant. Similar to the name, the address of the applicant on the image may also be visually highlighted within the user interface and may be highlighted simultaneously with the name of the applicant being highlighted. In some cases, each section of the displayed image may be highlighted using a different color and each corresponding user interface field in the user interface may be highlighted with a similar color so as to provide matching references between the ID image and the fields in the user interface. By way of example, the applicant's name may be highlighted pink (or perhaps a dotted background as shown in FIG. 14) in the displayed image of the ID, and the name field in the user interface may also be displayed or highlighted in pink. Correlations between the different colors, formatting, or emphasis will enable the applicant to quickly and efficiently locate corresponding fields and sections to verify that they match one another.

The particular visual layout of the user interface may, in some implementations, further include (e.g., in the product selection option as shown in FIGS. 7-10) a displayed first dashboard (e.g., dashboard 905 from FIG. 9) corresponding to a savings share and a second dashboard (e.g., dashboard 910 from FIG. 9) corresponding to a checking share. Here, the first dashboard and the second dashboard are displayed simultaneously with one another. Optionally, the first dashboard may be structured to display attributes associated with the savings share, where the attributes include an initial deposit amount, a nickname of the savings share, and performance information of the savings share.

Similarly, the second dashboard may be structured to display attributes associated with the checking share, where the attributes include an initial checking deposit amount, a checking nickname of the checking share, and one or more services available for selection to link to the checking share (e.g., the Courtesy Pay Opt-in, Enroll in Rewards, etc.). In some cases, the second dashboard includes a remove user interface element (e.g., as shown in FIG. 10) that, when selected, removes the second dashboard from visual display. Even further, the applicant information option recited earlier may, in some cases, include an icon (e.g., indication 1315 and 1320) indicating whether the applicant's ID was successfully analyzed to extract some of the applicant's personal information.

Method 2400 continues with either granting or denying membership (act 2435) based on the information provided by the applicant and based on results of the authentication checks. Accordingly, the embodiments provide a streamlined workflow process of determining membership eligibility of an applicant.

As discussed earlier, in some cases, the embodiments maintain a plurality of queues, where each queue is configured to track membership applications identified as sharing a determined characteristic. By way of example, some queues are configured to track completed applications while other queues are configured to track partially completed applications (e.g., membership applications that are partially completed and that are flagged for later completion). Another queue may be instantiated or provided to track membership applications that have been rejected. Indeed, any characteristic may be used to initiate a queue and to cause that queue to track applications having that type of characteristic.

Example Computer/Computer Systems

Figure 25:
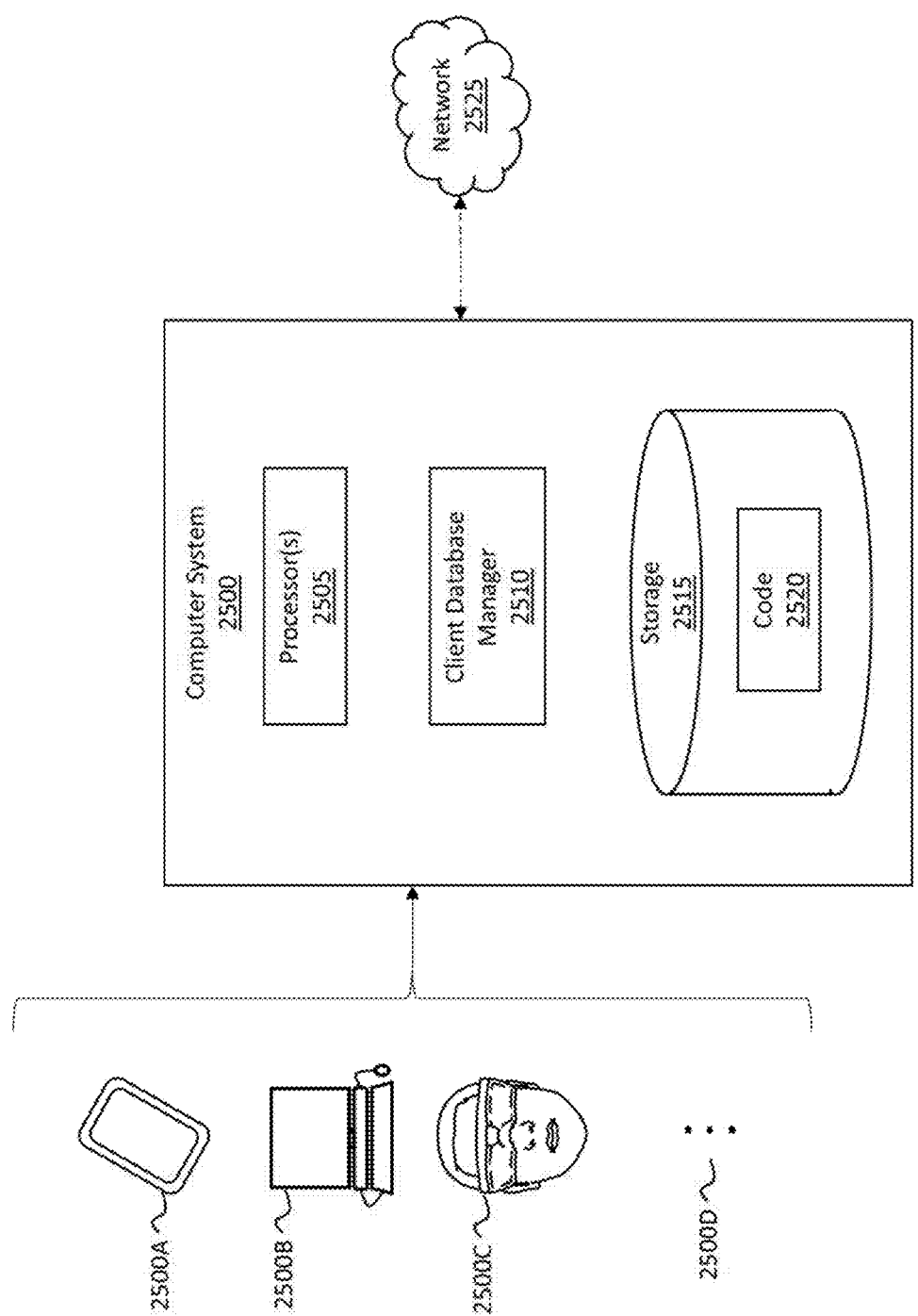
FIG. 25 illustrates an example computer system capable of performing or implementing any of the disclosed operations and workflow steps.

Attention will now be directed to FIG. 25 which illustrates an example computer system 2500 that may include and/or be used to perform any of the operations described herein. Computer system 2500 may take various different forms. For example, computer system 2500 may be embodied as a tablet 2500A, a desktop or laptop 2500B, a wearable device 2500C, a mobile device, a different type of standalone device, or any other type of device as shown by the ellipsis 2500D. Computer system 2500 may also be a distributed system that includes one or more connected computing components/devices that are in communication with computer system 2500.

In its most basic configuration, computer system 2500 includes various different components. FIG. 25 shows that computer system 2500 includes one or more processor(s) 2505 (aka a "hardware processing unit"), the disclosed client database manager 2510, and storage 2515.

Regarding the processor(s) 2505, it will be appreciated that the functionality described herein can be performed, at least in part, by one or more hardware logic components (e.g., the processor(s) 2505). For example, and without limitation, illustrative types of hardware logic components/processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

As used herein, terms such as "executable module," "executable component," "component," "module," "engine," "manager," or even the client database manager 2510 can refer to hardware processing units or to software objects, routines, or methods that may be executed on computer system 2500. The different components, modules, engines, and services described herein may be implemented as objects or processors that execute on computer system 2500 (e.g. as separate threads).

Storage 2515 may be physical system memory, which may be volatile, non-volatile, or some combination of the two. The term "memory" may also be used herein to refer to non-volatile mass storage such as physical storage media. If computer system 2500 is distributed, the processing, memory, and/or storage capability may be distributed as well.

Storage 2515 is shown as including executable instructions (i.e. code 2520). The executable instructions represent instructions that are executable by the processor(s) 2505 (or perhaps even the client database manager 2510) of computer system 2500 to perform the disclosed operations, such as those described in the various methods.

The disclosed embodiments may comprise or utilize a special-purpose or general-purpose computer including computer hardware, such as, for example, one or more processors (such as processor(s) 2505) and system memory (such as storage 2515), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Computer-readable media that carry computer-executable instructions are "transmission media." Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 2500 may also be connected (via a wired or wireless connection) to external sensors (e.g., one or more remote cameras) or devices via a network 2525. For example, computer system 2500 can communicate with any number devices or cloud services to obtain or process data. In some cases, network 2525 may itself be a cloud network. Furthermore, computer system 2500 may also be connected through one or more wired or wireless networks 2525 to remote/separate computer systems(s) that are configured to perform any of the processing described with regard to computer system 2500.

A "network," like network 2525, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 2500 will include one or more communication channels that are used to communicate with the network 2525. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system comprising:
one or more processors; and
one or more computer-readable hardware storage devices having stored thereon computer-executable instructions that are executable by the one or more processors to cause the computer system to at least:
display a user interface having a particular visual layout structured to facilitate progression of a workflow for an application of an applicant for a membership account with a credit union;
present, on the user interface, a membership account selection option for selecting a type of membership account to initiate with the credit union;
display, based on a selected type of membership account, on the user interface, a listing of product type selection options corresponding to a plurality of product types;
receive, via the user interface, a first selection from the listing of product type selection options corresponding to a first product type of the plurality of product types;
display, based on the first selection, a first dashboard corresponding to a first product of the first product type within the user interface, wherein the first dashboard has a first user interface element configured to receive a first user input;
receive, via the user interface, a second selection from the listing of product type selection options corresponding to a second product type of the plurality of product types, wherein the second product type is different from the first product type;
display, based on the second selection, a second dashboard corresponding to a second product of the second product type within the user interface simultaneously with the first dashboard, wherein the second dashboard has a second user interface element configured to receive a second user input;
edit automatically a first attribute independently associated with the first product based on the first user input received through the first dashboard and a second attribute independently associated with the second product based on the second user input received through the second dashboard, to thereby customize the first product and the second product for the applicant;
display, on the user interface, an applicant information option to enter information of the applicant;
link the information of the applicant entered in the applicant information option with each of the first product having the first attribute and the second product having the second attribute;
determine, based on the information entered in the applicant information option, that the applicant is eligible for membership with the credit union; and
initiate one or more authentication checks based on the information entered in the application information option; and
grant or deny membership to the applicant based on the information and based on a result of the one or more authentication checks.

2. The computer system of claim 1, wherein execution of the computer-executable instructions further causes the computer system to maintain a plurality of queues, wherein each queue is configured to track membership applications identified as sharing a determined characteristic.

3. The computer system of claim 2, wherein a first queue tracks membership applications that are partially completed and that are flagged for later completion and a second queue tracks membership applications that have been rejected.

4. The computer system of claim 1, wherein:
the particular visual layout of the user interface includes an image of an identification (ID) of the applicant, where the image is displayed simultaneously with at least some of the information entered in the applicant information option; and
one or more sections of the image, which is included as a part of the particular visual layout of the user interface, are displayed in an emphasized form to correspond to the at least some of the information displayed simultaneously with the image.

5. The computer system of claim 4, wherein the computer system includes a camera, and wherein the image is generated by the camera capturing a photograph of the applicant's ID.

6. The computer system of claim 4, wherein the at least some of the information entered in the applicant information option is auto-populated by extracting said at least some information from the image of the applicant's ID.

7. The computer system of claim 4, wherein the one or more sections of the image include a section listing a name of the applicant, and wherein the name of the applicant on the image is visually highlighted simultaneously with highlighting applied to a name user interface field in the user interface.

8. The computer system of claim 7, wherein the one or more sections of the image include a second section listing an address of the applicant, and wherein the address of the applicant on the image is visually highlight within the user interface simultaneously with the name of the applicant being highlighted, and wherein the address of the applicant on the image is simultaneously highlighted with highlighting applied to an address user interface field in the user interface.

9. The computer system of claim 1, wherein a database maintains membership applications, and wherein the database uses an abstract data structure to organize the membership applications; and wherein the database pushes automatically, the applicant information to a core database of the credit union in a format that has been modified to meet a configuration of the core database and requirements of the core database.

10. The computer system of claim 1, wherein when the first selection is made from the listing of product selection options, the listing of product selection options remains displayed in the user interface so that subsequent selections from the listing of product selection options may be made.

11. A method for facilitating progression of a membership application workflow to determine membership eligibility with a credit union, said method comprising:
displaying a user interface having a particular visual layout structured to facilitate progression of a workflow for an application of an applicant for a membership account with a credit union;

presenting, on the user interface, a membership account selection option for selecting a type of membership account to initiate with the credit union;

displaying, based on a selected type of membership account, on the user interface, a listing of product type selection options corresponding to a plurality of product types;

receiving, via the user interface, a first selection from the listing of product type selection options corresponding to a first product type of the plurality of product types;

displaying, based on the first selection, a first dashboard corresponding to a first product of the first product type within the user interface, wherein the first dashboard has a first user interface element configured to receive a first user input;

receiving, via the user interface, a second selection from the listing of product type selection options corresponding to a second product type of the plurality of product types, wherein the second product type is different from the first product type;

displaying, based on the second selection, a second dashboard corresponding to a second product of the second product type within the user interface simultaneously with the first dashboard, wherein the second dashboard has a second user interface element configured to receive a second user input;

editing, automatically, a first attribute independently associated with the first product based on the first user input received through the first dashboard and a second attribute independently associated with the second product based on the second user input received through the second dashboard, to thereby customize the first product and the second product for the applicant;

displaying, on the user interface, an applicant information option to enter information of the applicant;

linking the information of the applicant entered in the applicant information option with each of the first product having the first attribute and the second product having the second attribute; and determining, based on the information entered in the applicant information option, that the applicant is eligible for membership with the credit union; and initiating one or more authentication checks based on the information entered in the application information option.

12. The method of claim 11, wherein the one or more authentication checks include a background check performed on the information provided by the applicant.

13. The method of claim 11, wherein the first dashboard corresponds to a savings share and the second dashboard corresponds to a checking share, wherein the first dashboard and the second dashboard being displayed simultaneously with one another indicates that both the savings share and the checking share are being linked with the applicant.

14. The method of claim 13, wherein:
the first dashboard displays a first plurality of attributes associated with the savings share, the first plurality of attributes including an initial deposit amount, a nickname of the savings share, and performance information of the savings share; and
the second dashboard displays a second plurality of attributes associated with the checking share, the second plurality of attributes including an initial checking deposit amount, a checking nickname of the checking share, and one or more services available for selection to link to the checking share.

15. The method of claim 11, wherein:
the particular visual layout of the user interface includes an image of an identification (ID) of the applicant, where the image is displayed simultaneously with at least some of the information entered in the applicant information option, and
one or more sections of the image, which is included as a part of the particular visual layout of the user interface, are displayed in an emphasized form to correspond to the at least some of the information displayed simultaneously with the image.

16. The method of claim 15, wherein the at least some of the information entered in the applicant information option is auto-populated by extracting said at least some information from the image of the applicant's ID and wherein the applicant information option displays an icon indicating that the applicant's ID was successfully analyzed to extract the at least some of the information.

17. The method of claim 11, wherein the first dashboard includes a remove user interface element that, when selected, removes the dashboard from visual display and unlinks the product type from the applicant.

18. One or more hardware storage devices having stored thereon computer-executable instructions that are executable by one or more processors of a computer system to cause the computer system to at least:

display a user interface having a particular visual layout structured to facilitate progression of a workflow for an application of an applicant for a membership account with a credit union;

present, on the user interface, a membership account selection option for selecting a type of membership account to initiate with the credit union;

display, based on a selected type of membership account, on the user interface, a listing of product type selection options corresponding to a plurality of product types;

receive, via the user interface, a first selection from the listing of product type selection options corresponding to a first product type of the plurality of product types;

display, based on the first selection, a first dashboard corresponding to a first product of the first product type within the user interface, wherein the first dashboard has a first user interface element configured to receive a first user input;

receive, via the user interface, a second selection from the listing of product type selection options corresponding to a second product type of the plurality of product types, wherein the second product type is different from the first product type;

display, based on the second selection, a second dashboard corresponding to a second product of the second product type within the user interface simultaneously with the first dashboard, wherein the second dashboard has a second user interface element configured to receive a second user input;

edit automatically a first attribute independently associated with the first product based on the first user input received through the first dashboard and a second attribute independently associated with the second product based on the second user input received through the second dashboard, to thereby customize the first product and the second product for the applicant;

display, on the user interface, an applicant information option to enter information of the applicant;

link the information of the applicant entered in the applicant information option with each of the first product having the first attribute and the second product having the second attribute; and determine, based on the information entered in the applicant information option, that the applicant is eligible for membership with the credit union; and initiate one or more authentication checks based on the information entered in the application information option.

19. The one or more hardware storage devices of claim 18, wherein the first dashboard corresponds to a savings share and the second dashboard corresponds to a checking share,
- wherein the first dashboard and the second dashboard being displayed simultaneously with one another indicates that both the savings share and the checking share are being linked with the applicant,
- wherein the first dashboard displays a first plurality of attributes associated with the savings share, the first plurality of attributes including an initial deposit amount, a nickname of the savings share, and performance information of the savings share, and
- wherein the second dashboard displays a second plurality of attributes associated with the checking share, the second plurality of attributes including an initial checking deposit amount, a checking nickname of the checking share, and one or more services available for selection to link to the checking share.

20. The one or more hardware storage devices of claim 18, wherein:
- the particular visual layout of the user interface includes an image of an identification (ID) of the applicant,
- the image is displayed simultaneously with at least some of the information entered in the applicant information option, and
- a machine learning algorithm extracts, from the image, the at least some of the information, the machine learning algorithm comprising at least one of:
  a convolutional neural network;
  a multilayer neural network;
  a recursive neural network;
  a deep neural network;
  a linear regression model;
  a logistic regression model; or
  a support vector machine.

* * * * *